United States Patent
Maekawa et al.

(10) Patent No.: US 6,915,071 B2
(45) Date of Patent: Jul. 5, 2005

(54) PHOTOGRAPHING AND PRINTING DEVICE, PRINTING PAPER UNIT, METHOD FOR CONTROLLING THE PHOTOGRAPHING AND PRINTING DEVICE, CONTROL PROGRAM OF THE PHOTOGRAPHING AND PRINTING DEVICE, AND COMPUTER-READABLE RECORDING MEDIUM STORING THE SAME THEREIN

(75) Inventors: Koji Maekawa, Nagaokakyo (JP); Yukiyasu Takao, Otsu (JP); Tadasu Maeda, Tokyo (JP); Masanori Saito, Shiga (JP); Tsuneo Okada, Nishinomiya (JP); Sachiro Arimoto, Shiga (JP); Masamichi Akima, Kyoto (JP); Tetsuya Miwa, Nagaokakyo (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 10/447,143

(22) Filed: May 29, 2003

(65) Prior Publication Data

US 2004/0028397 A1 Feb. 12, 2004

(30) Foreign Application Priority Data

Jun. 3, 2002 (JP) ........................................ 2002-161462
Aug. 30, 2002 (JP) ........................................ 2002-255298

(51) Int. Cl.[7] ............................................. G03B 15/00
(52) U.S. Cl. ............................................. 396/2; 348/61
(58) Field of Search ................................. 396/2; 348/61

(56) References Cited

U.S. PATENT DOCUMENTS

| | | | | |
|---|---|---|---|---|
| 5,196,876 A | * | 3/1993 | Thayer .......................... | 396/2 |
| 6,085,195 A | * | 7/2000 | Hoyt et al. .................... | 707/10 |
| 6,148,148 A | * | 11/2000 | Wain et al. .................... | 396/2 |
| 6,317,560 B1 | * | 11/2001 | Kawabata ...................... | 396/2 |
| 6,385,628 B1 | * | 5/2002 | Massarsky .................. | 715/502 |
| 6,519,596 B1 | * | 2/2003 | Hoyt et al. .................... | 707/10 |
| 6,523,034 B1 | * | 2/2003 | Hoyt et al. .................... | 707/10 |

FOREIGN PATENT DOCUMENTS

JP           2000-69404           3/2000

* cited by examiner

Primary Examiner—David M. Gray
(74) Attorney, Agent, or Firm—Dickstein Shapiro Morin & Oshinsky LLP

(57) ABSTRACT

A photographing and printing device includes a mode selecting section for selecting one mode as a selection mode among from a plurality of modes which are set in advance and a mood creating device (touch panel, lighting device, and speaker) for creating a mood in accordance with the selection mode. With this arrangement, controlling the mood creating device in accordance with the selection mode makes it possible to create a specific mood throughout the device in various ways.

17 Claims, 16 Drawing Sheets

FIG. 13

| | | | | | |
|---|---|---|---|---|---|
| 🐱 | 🐱 | 🐱 | 🐱 | 🐱 | 🐱 |
| 🐶 | 🐶 | 🐶 | 🐶 | 🐶 | 🐶 |
| ▨ | Heh-Heh | Mm-hm | Daydreaming | Shoot! | Grin |
| ▨ | Heh-Heh | Mm-hm | Daydreaming | Shoot! | Grin |
| LOT | LUCKY | BLANK | | | |
| COMPATIBILITY BETWEEN YOUS | LOVING COUPLE | BEST FRIENDS | TOTAL STRANGERS | CAT AND DOG | SWORN ENEMIES |
| ORACLE | BEST LUCK | AVERAGE GOOD LUCK | AVERAGE LUCK | LUCKY IN THE END | BAD LUCK |

75 → (left column)
76 (right columns)

PHOTOGRAPHING AND PRINTING DEVICE, PRINTING PAPER UNIT, METHOD FOR CONTROLLING THE PHOTOGRAPHING AND PRINTING DEVICE, CONTROL PROGRAM OF THE PHOTOGRAPHING AND PRINTING DEVICE, AND COMPUTER-READABLE RECORDING MEDIUM STORING THE SAME THEREIN

FIELD OF THE INVENTION

The present invention relates to a photographing and printing device, installed in an amusement arcade, for example, for printing a photo of user's face and figure, and a printing paper unit applied to the photographing and printing device, a method for controlling a photographing and printing device, a control program of a photographing and printing device, and a computer-readable recording medium storing the program therein.

BACKGROUND OF THE INVENTION

Conventionally, in amusement facilities such as amusement arcades, enjoying a popularity is a photographing and printing device which takes a photograph of users, combines the photo with background picture and others, and outputs it as a sticker print. Especially widely used is a model of the device which after taking a photograph, performs decoration (image editing) with a pointing device e.g. touch pen with respect to a photograph image displayed on a display screen, and prints out the resultant image after checking on the screen.

As to this decorating function, users can make a choice among from a plurality of pens (brushes) with different colors, line styles, patterns, and others displayed on the screen, and points are created with a touch pen by the user or lines are created with the pen selected by the users on the photograph image displayed on the screen. Further, on the photograph image displayed on the screen, a stamp selected among from stamps with different patterns is created at the position specified with the touch pen by the user. In addition, a generally used function is a rolling stamp which creates pictures changing like a cartoon with four frames spaced at a certain interval on the line created with the pen.

Further, Japanese Unexamined Patent Publication No. 2000-69404 (Tokukai 2000-69404), for example, discloses an image print creating device in which a makeup processing is performed on the photographed image by a user, and a print image that the user desires can be printed out.

Moreover, increasing number of photographing and printing devices provide various photographing effects making full use of a plurality of cameras and lighting devices.

Incidentally, a photographing and printing device is needed to have a high quality image as well as the element of amusement in the process of photographing and decoration. In order to attract the users to repeatedly use the photographing and printing device, it is necessary to prevent the users with variety of tastes from losing interest in the photographing and printing device.

Therefore, the photographing and printing device never stops more functionality for decoration and increase in contents (pictures). As a result, the users must select ones they want to use among from enormous numbers of functions and contents and make decorations during the time limit, which makes it difficult for users to make decorations using most suitable functions and contents matching an user's image of photographing. That is, enormous numbers of functions and contents make it difficult for users to make full use of them.

Further, the photographing and printing device increases a variety of functions for decoration as described above, whereas equipment for use in decoration except for a touch panel hardly helps to create some mood for photographing. This means that a mood creation throughout the device is not sufficient in spite of important elements for amusement. That is, it is difficult to create a uniform mood in a photographing environment in which the users operate.

SUMMARY OF THE INVENTION

The present invention has been attained to solve the problem, and an object of the present invention is to provide a photographing and printing device which can create a specific mood throughout the device in various ways, a printing paper unit applied to the photographing and printing device, and a method for controlling a photographing and printing device. The object of the present invention further includes provision of a control program of a photographing and printing device to realize the photographing and printing device and a computer-readable recording medium storing the control program therein.

In order to achieve the above object, a photographing and printing device according to the present invention which prints out a photographed image of a user has an arrangement in which included are a mode selecting section for selecting one mode as a selection mode among from a plurality of modes which are set in advance and a mood creating device for creating a mood in accordance with the selection mode.

Further, a method for controlling a photographing and printing device according to the present invention which prints out a photographed image of a user is a method including a mode selecting step of selecting one mode as a selection mode among from a plurality of modes which are set in advance and a mood creation controlling step of controlling a mood creating device in accordance with the selection mode.

With the above arrangement and method, the photographing and printing device has a plurality of modes and controls the mood creating means (e.g. touch panel, lighting device, and speaker) so as to create a mood in the device in accordance with one selection mode selected among from the plurality of modes.

Therefore, the photographing and printing device can create a specific mood throughout the device in various ways for each mode. Here, the mood creating means is a united set of e.g. user interface such as operation screen and voice guidance, tools, lighting, sound, vibration, print setting for color tone and others.

Therefore, since a uniform mood for one mode can be created in various ways, it is possible to realize a low-cost photographing and printing device which can provide users with enough amusement.

For a fuller understanding of the nature and advantages of the invention, reference should be made to the ensuing detailed description taken in conjunction with the accompanying drawings.

BRIEF DESCRIPTION OF THE DRAWINGS

FIG. 13 is an explanatory view showing one example of a secret picture setting table used by the photographing and printing device shown in FIG. 1.

DESCRIPTION OF THE EMBODIMENTS

[First Embodiment]

Referring to FIGS. 1 through 11 the following will explain one embodiment of the present invention.

A photographing and printing device 1, 1' according to the present embodiment has at least functions of taking a photo of a user, of causing a user to perform editing e.g. decorations on the taken photo, and of printing out an edited image.

In the photographing and printing device 1, 1', user interface, some other devices, and contents for image editing integrally create an atmosphere throughout the photographing and printing device in accordance with a selection mode. Therefore, a specific structure of the photographing and printing device is not limited to those of the photographing and printing device 1 (FIGS. 2 through 4) and photographing and printing device 1' (FIG. 5).

Note that, the following explanation is about the case of decorating the photographed image in an image editing processing, but the image editing processing allows a general processing for image editing. In addition, a detailed description will be made about a horror mode as the selection mode, and the photographing and printing device 1, 1' may be changed in hardware configurations (e.g. elevation angle lighting device 17c) and software configurations suitable for an arbitrary mode.

Figure 2:
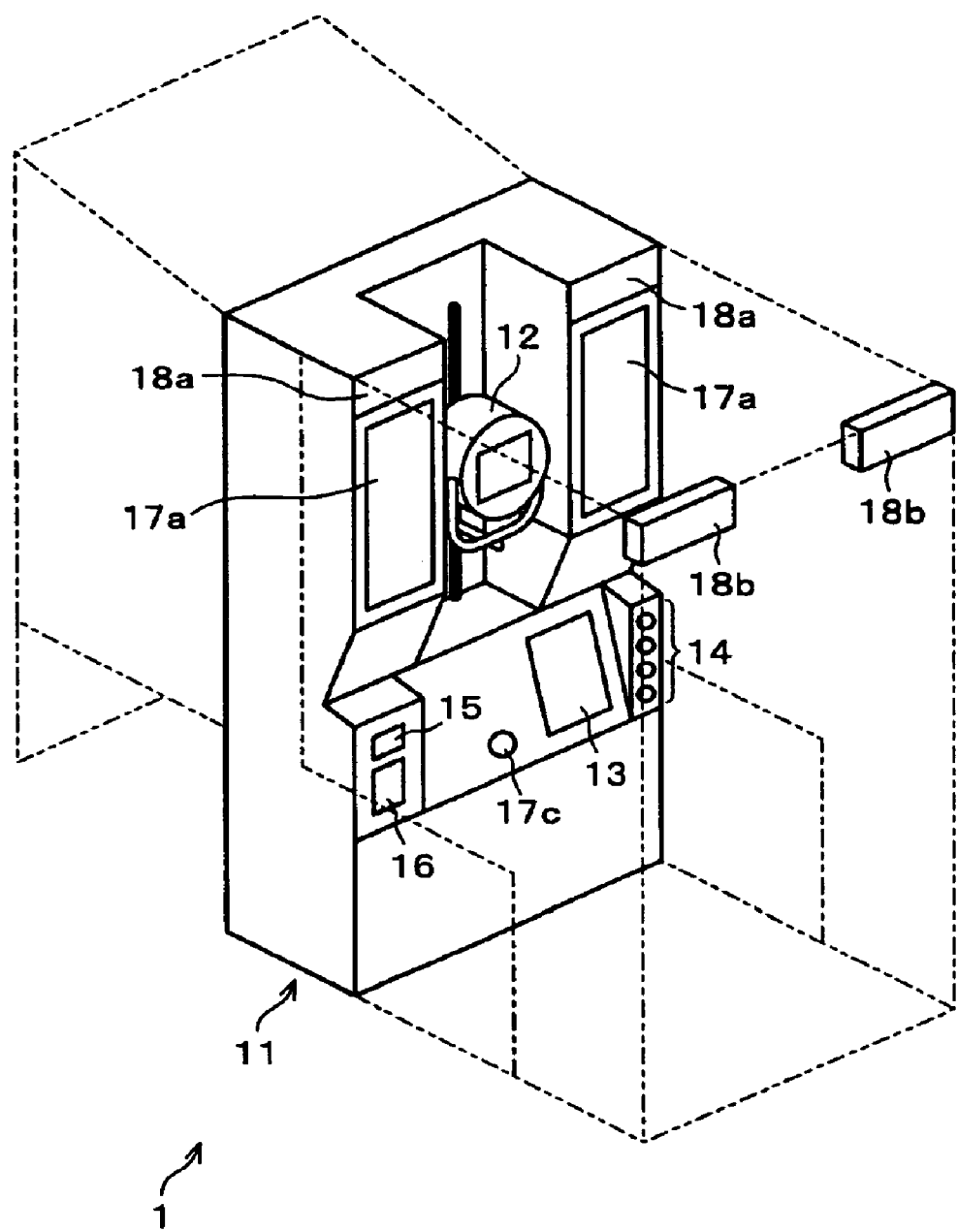
FIG. 2 is a perspective diagram schematically showing a structure of a photographing room, which is one example of an external appearance of the photographing and printing device shown in FIG. 1.
Figure 3:
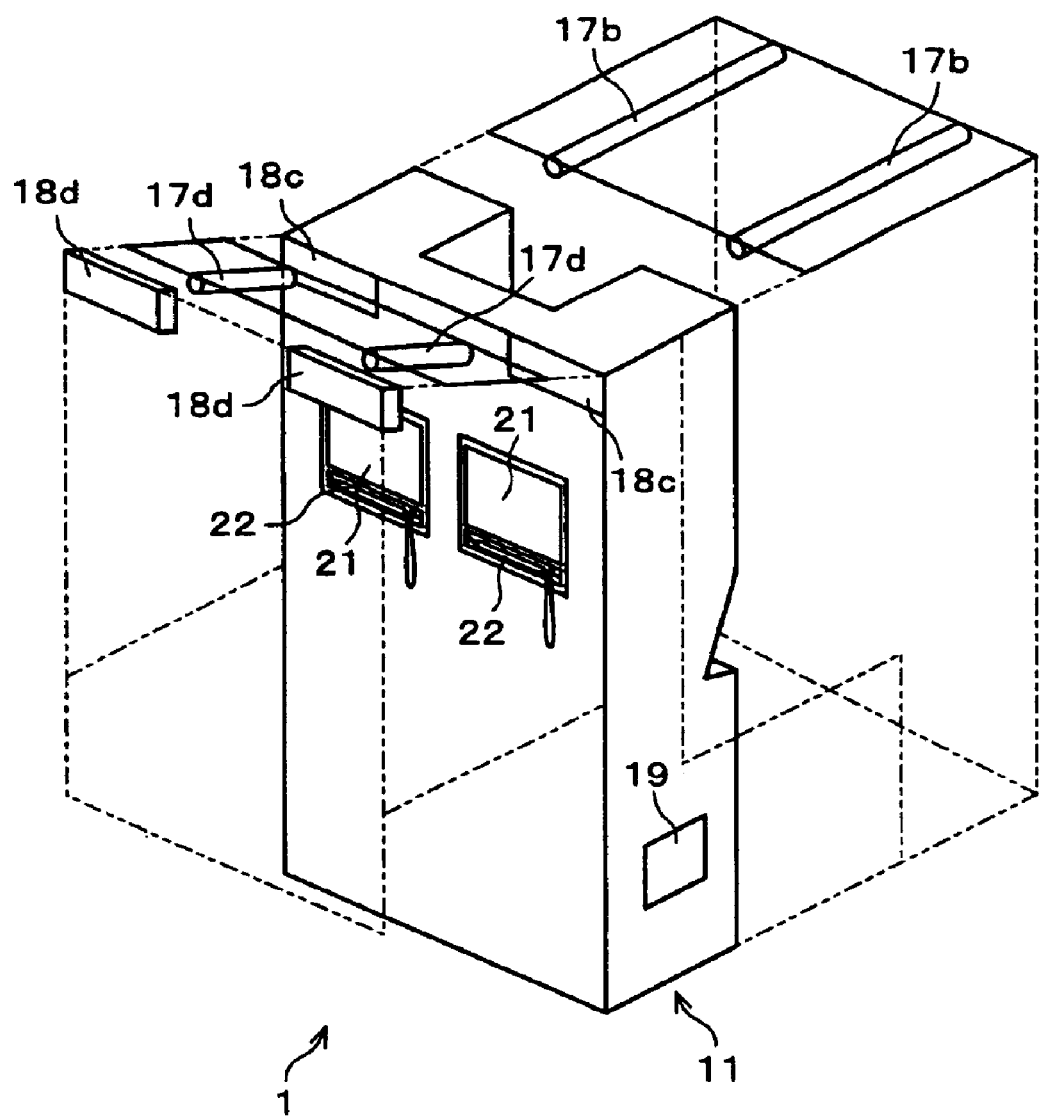
FIG. 3 is a perspective diagram schematically showing a structure of a decorating room of the photographing and printing device shown in FIG. 2.
Figure 4:
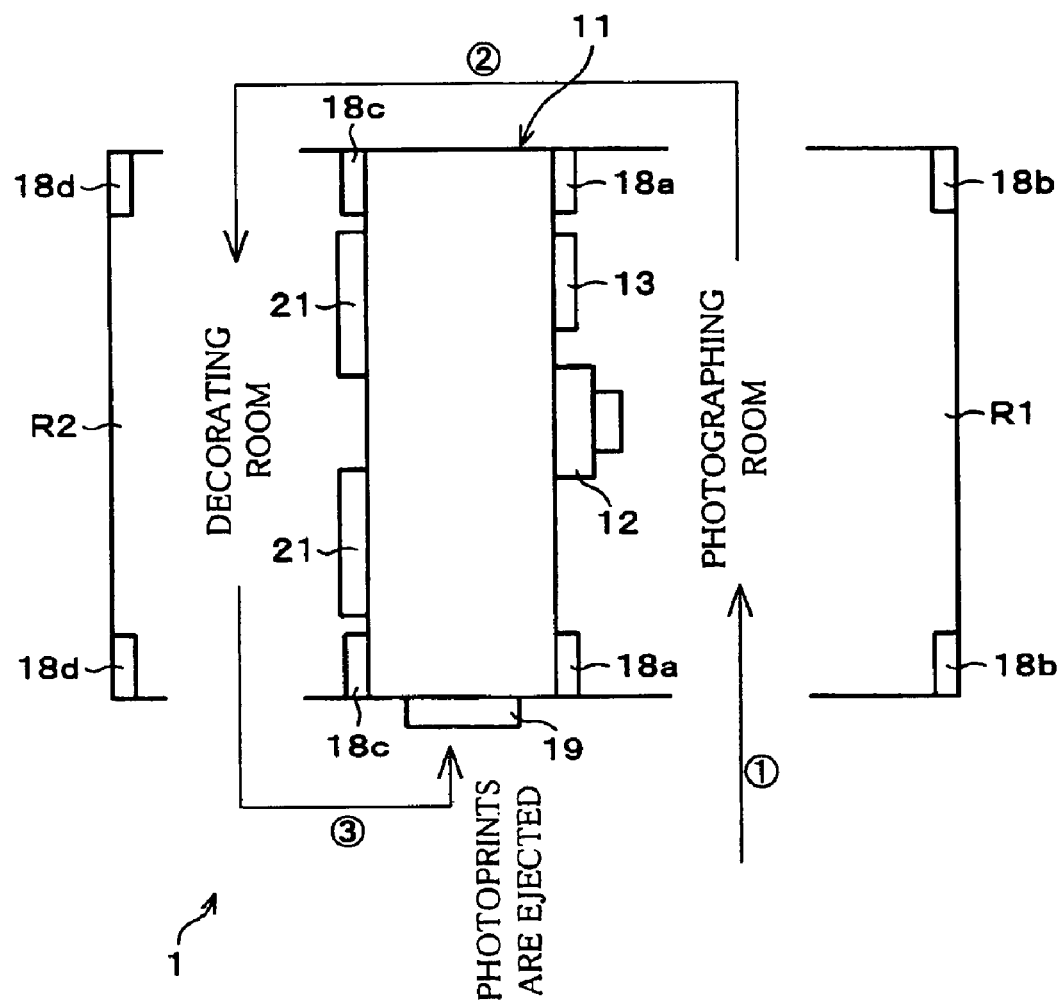
FIG. 4 is an explanatory view showing a track where a user moves during use of the photographing and printing device shown in FIGS. 2 and 3.
Figure 5:
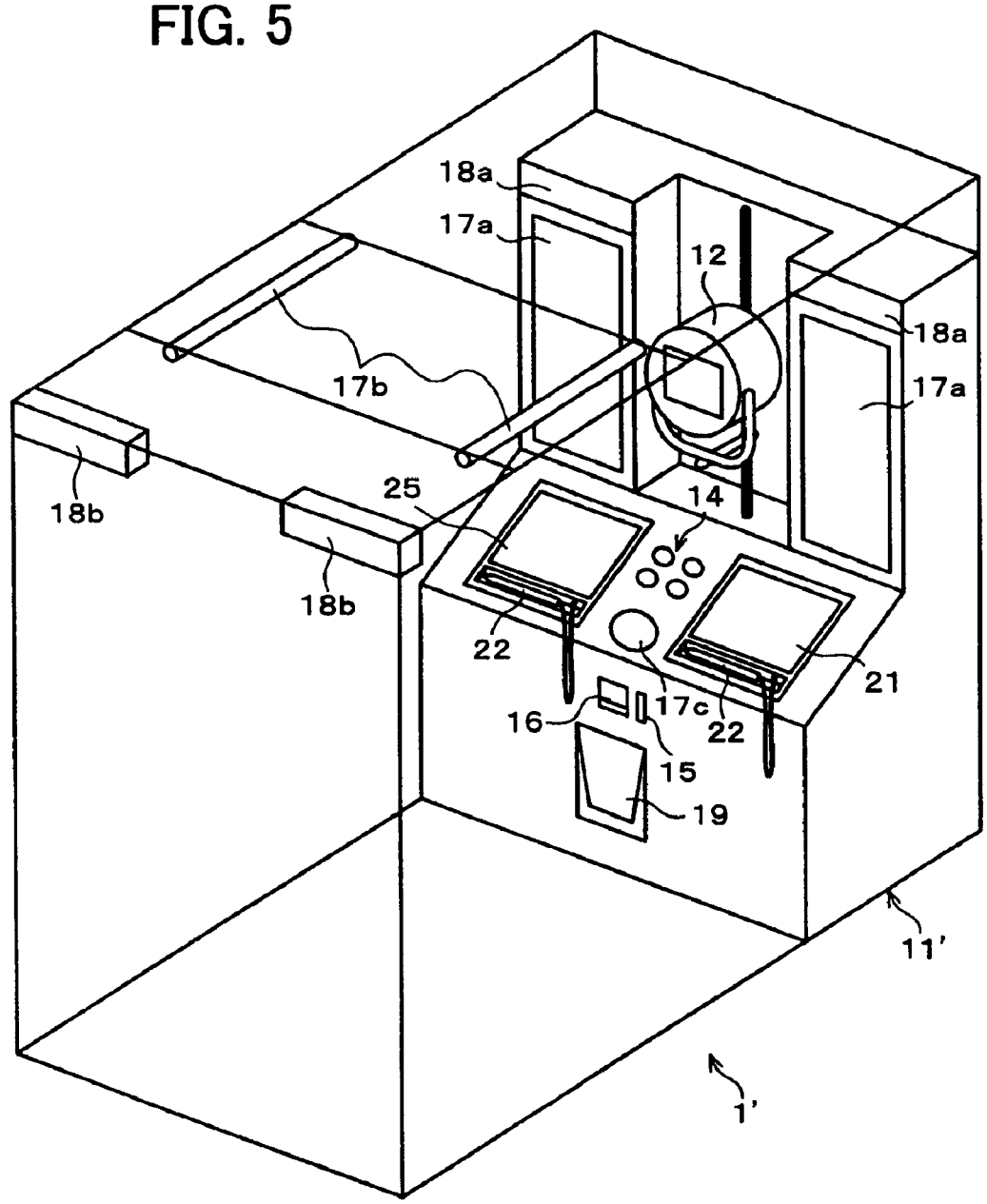
FIG. 5 is a perspective diagram showing another example of an external appearance of the photographing and printing device shown in FIG. 1.

In the beginning, referring to FIGS. 2 through 4, the following will explain the external appearance of the photographing and printing device 1. FIG. 2 is a perspective diagram showing a photographing room R1 of the photographing and printing device 1. FIG. 3 is a perspective diagram showing a decorating room R2 of the photographing and printing device 1. FIG. 4 is an explanatory diagram showing the movement of the user during use of the photographing and printing device 1.

As shown in FIG. 4, the photographing and printing device 1 is arranged so that the respective spaces in front of two opposite faces of a main body 11 are the photographing room R1 and decorating room R2. Around each of the photographing room R1 and decorating room R2 provided is a curtain (shown as chain double-dashed lines in FIGS. 2 and 3) that is composed of a vinyl sheet or other material having light blocking effects. This curtain can prevent lights from coming inside a photographing area during photography, thus performing more excellent photography. Further, this curtain can effectively create a mood with lighting and sound during photography processing and decoration processing and prevent a peep from outside and other actions for the protection of user's privacy.

As shown in FIG. 2, the main body 11 includes a camera 12, a touch panel 13, an operation button 14, a coin slot 15, a coin return bucket 16, a front lighting device 17a, an elevation angle lighting device 17c, and a front speaker 18a, which are provided on the side of the photographing room R1. The photographing room R1 is also provided with a ceiling lighting device 17b (FIG. 3) and rear speakers 18b.

Further, as shown in FIG. 3, the main body 11 includes touch panels 21, touch pens 22, and front speakers 18c, which are provided on the side of the decorating room R2. The decorating room R2 is also provided with ceiling lighting devices 17d and rear speakers 18d. In addition, as shown in FIG. 3, a print ejection port 19 is provided on a side face of the main body 11.

The camera (photographing means) 12 takes a photo of a user. The camera 12 mounts therein a digital camera which is provided with a group of lens, an aperture, a CCD (Charge Coupled Device) image pickup device, and others. Further, the camera 12 may be arranged so that a group of lens, an aperture, a filter, and others are changeable to support multiple techniques for photography, including a close-up photography and full-length photography. The camera 12 is installed to the main body 11 so as to freely move up and down by means of a rail provided vertically, so that the camera 12 can be placed at a right position in accordance with a user's instruction or others.

The touch panels 13 and 21 are arranged, for example, in such a manner that a flat panel display such as liquid crystal display element, a CRT (Cathode Ray Tube), or the like has a touch sensor provided on its display surface.

The touch panel (mood creating device, mood creating means, user interface means) 13 is provided in the photographing room R1 to display various messages and images in the photography processing. Specifically, on the touch panel 13 displayed are a demonstration screen, an opening screen, an instruction screen for charge processing, various operation contents in the photography processing, a photographing screen during photography, and other screens.

The operation button 14 is provided for input of the operations without using the touch panel 13. Note that, even operations that can be inputted from the touch panel 13 may be also allowed input from the operation button 14.

The touch panel (mood creating device, mood creating means, user interface means) 21 is provided in the decorating room R2 to display various messages and images in the decoration processing. Specifically, on the touch panel 21 displayed are an image to be edited in the image editing processing, e.g. decoration processing, various editing tools, and others. Thus, when the photographing and printing device 1 operates, the various messages and images to be presented to users are displayed on the touch panels 13 and 21.

In addition, near the touch panel 21 (below the touch panel 21 in FIG. 3) provided is a touch pane 22. With a touch of the touch pen 22 on the touch panel 21, users can select buttons displayed in accordance with a course of the processing and perform image drawing such as decoration.

Here, as shown in FIG. 3, the photographing and printing device 1 is provided with two sets of touch panel 21 and touch pen 22 side by side. This allows two users to simultaneously input e.g. their decorations on the photograph image displayed each on the two touch panels 21. Note that, on the touch panels 21 different photograph images can be displayed respectively, and the users can input e.g. decorations on the separate photograph images. Further, in the decoration processing, a reflection processing for reflecting the decorations inputted from one touch panel 21 to another, processing for limiting an area where decorations can be made, and other processing are carried out by an image editing section 52 (in FIG. 1).

The coin slot 15 is a slot that users insert coins for a predetermined amount of playing fee. Further, the coin return bucket 16 is a return bucket to return coins to the users in the case where changes are given or reset operation is made by users after coins are inserted to the coin slot 15. Note that, a processing for checking whether a predetermined amount of playing fee is inserted and a processing for giving changes are carried out by a charge processing section 32 (in FIG. 1). Inside the main body 11 also provided is a coin container (not shown) for storing coins collected from the users.

The print ejection port 19 is a place to eject photoprints printed after users complete photographing and editing operations. The print ejection port 19 is arranged on a side face of the main body 11, and the users who complete the editing operation move close to the print ejection port 19 to take out the photoprints (in FIG. 4).

The front lighting devices 17a and ceiling lighting devices 17b in the photographing room R1 serve as lighting equipment under a usual state as well as flashlights during photography. Inside this lighting device 5 provided are, for example, a stroboscopic lighting section for shining light when a flashlight is used and a fluorescent lamp for shining light as lighting equipment under a usual state. The elevation angle lighting device 17c is lighting equipment for shining a spotlight from under users' face in a horror mode, as described later. Note that, the photographing and printing device 1 can place lighting devices intended for obtaining special lighting effects in a particular mode as appropriate. Further, the ceiling lighting device 17d in the decorating room R2 serves as lighting equipment during decoration.

Here, the lighting device (mood creating device, mood creating means) 17 of the photographing and printing device 1 (hereinafter referred to as "lighting device 17" for giving a generic name for lighting devices of the photographing and printing device 1, including the front lighting devices 17a, the ceiling lighting devices 17b, the elevation angle lighting device 17c, and the ceiling lighting devices 17d) is controlled, as a mood creating device for creating some atmospheres of the photographing and printing device 1, in accordance with a mode by the mode creating device control section 51 (in FIG. 1). Therefore, in addition to the lighting devices 17a through 17d, the photographing and printing device 1 may be provided with other lighting devices for mood creation inside or outside photographing room R1 and the decorating room R2.

The speaker (mood creating device, mood creating means, user interface means) 18 (hereinafter referred to as "speaker 18" for giving a generic name for sound reinforcement equipment of the photographing and printing device 1, including the front speakers 18a, the rear speakers 18b, the front speakers 18c, and the rear speakers 18d) outputs voice guidance and sound effects in various operations. The speaker 18 is controlled, as a mood creating device for creating some atmospheres of the photographing and printing device 1, in accordance with a mode by the mood creating device control section 51 (in FIG. 1). Therefore, in addition to the speakers 18a through 18d, the photographing and printing device 1 may be provided with other speakers for mood creation inside or outside photographing room R1 and the decorating room R2.

As described above, as shown in FIG. 4, the photographing and printing device 1 offers services in accordance with the following flow: (1) a user goes into the photographing room R1 and controls in brightness to take a photo; (2) the user moves to the decorating room R2, decorates a taken image, and put the image decorated into print; and (3) the user goes out of the decorating room R2 and waits the ejection of a sticker until the user accepts them.

With the arrangement of the photographing and printing device 1 having the separate photographing room R1 for performing photography and decorating room R2 for performing decoration, it is possible to receive visitors in both of the photographing room R1 and the decorating room R2, which is advantageous in increasing a turnover rate of users.

Next, referring to FIG. 5, the following will explain the external appearance of a photographing and printing device 1' which is a modification example of the photographing and printing device 1. Note that, the photographing and printing device 1 and 1' essentially have the same arrangement.

The photographing and printing device 1' differs from the photographing and printing device 1 in that the photography processing and the decoration processing are performed in a single room. In the photographing and printing device 1', on the touch panel 21 for performing the decoration processing displayed are various messages and images in the photography processing. That is, the touch panel 21 of the photographing and printing device 1' additionally includes functions of the touch panel 13 of the photographing and printing device 1.

The photographing and printing device 1' therefore allows users to continuously perform the photography processing and decoration processing without moving from one room to another room, so that it is possible to maintain an atmosphere produced by mood creation.

Figure 1:
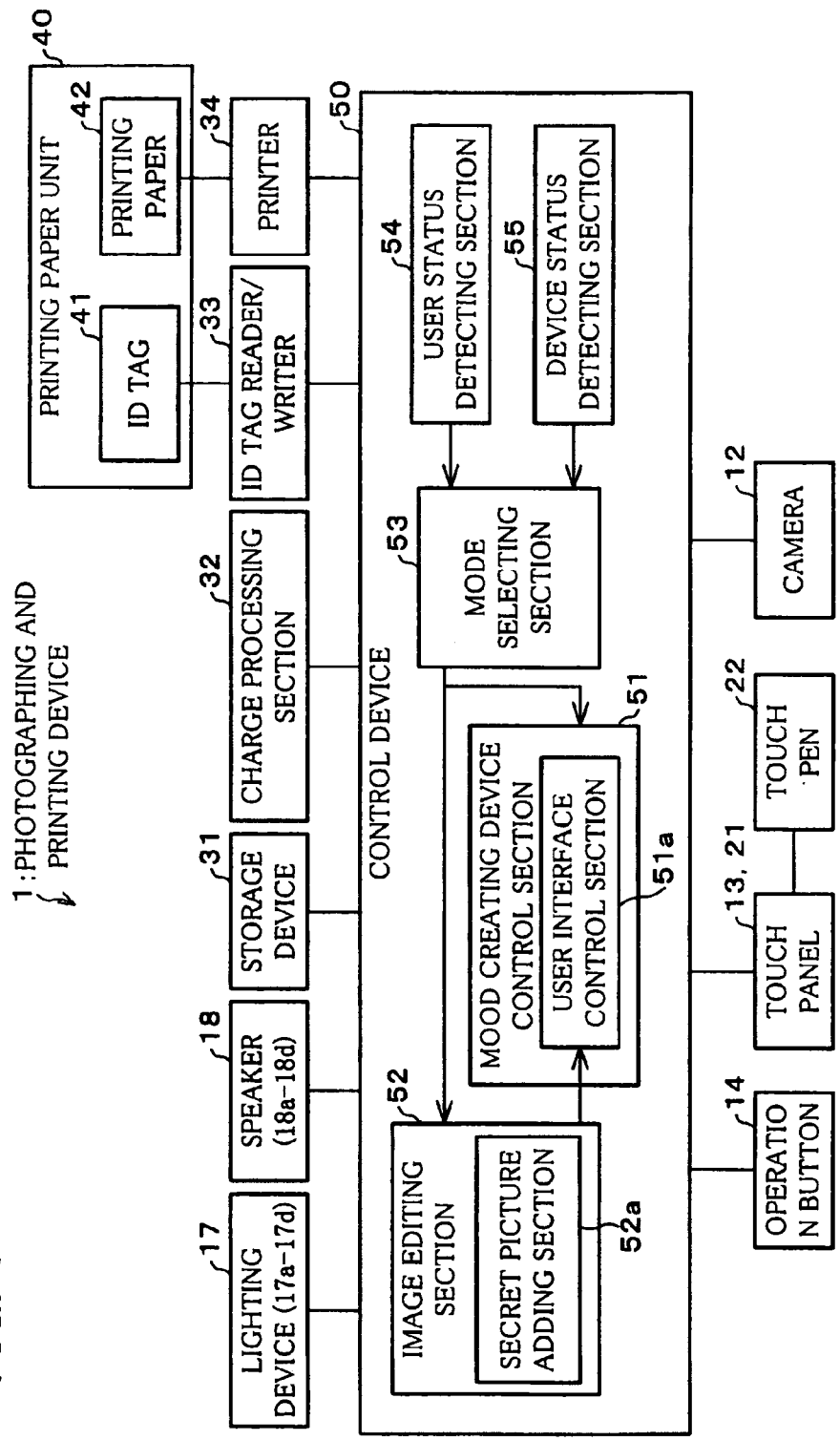
FIG. 1 is a functional block diagram schematically showing a photographing and printing device according to one embodiment of the present invention.

Then, referring to FIG. 1, the following will explain functions of the photographing and printing device 1 (1'). Note that, since the photographing and printing device 1 and 1' have the same functions, the following will only explain the photographing and printing device 1.

As shown in FIG. 1, in addition to the aforementioned camera 12, touch panels 13 and 21, touch pen 22, operation button 14, lighting device 17, speaker 18, the photographing and printing device 1 is provided with a control device 50, a storage device 31, a charge processing section 32, an ID tag reader/writer 33, and a printer 34. The photographing and printing device 1 also has a printing paper unit 40.

The control device 50 performs centralized control for the operations of the aforementioned various components inside the photographing and printing device 1. The control device 50 is realized by, for example, a general-purpose computer such as PC. The operations of the various components are controlled by a control program executed by a computer. The program may be used in such a manner that the program stored in a removable medium, e.g. CD-ROM is read out or that the program installed on a hard disk or the like is read out. Further, in the case where the control device 50 is connected to a communication network such as the Internet, it may be taken into consideration such a manner that the foregoing program downloaded via this communication network is installed on a hard disk or the like to be executed.

The storage device 31 is realized by a nonvolatile storage device such as the foregoing hard disk. Examples of the contents stored in this storage device 31 include the foregoing control program (including data in accordance with selection modes, such as contents for image editing), an OS (Operating System) program and some other kinds of programs, a setting value for the operation of the camera 12, and image data of photograph images and edited images. Examples of the setting value for the operation of the camera 12 include a value of white balance which is set e.g. at the time of shipment for the device or at the time of maintenance of the device and various parameter values on image processing in controlling a tone of photograph images and others.

The charge processing section 32 performs processing on charges collected from users. In accordance with a charge status by the charge processing section 32, the control device 50 controls operations for the users.

The ID tag reader/writer (identification information reading means) 33 and the printer (printing means) 34 constitutes a printer unit, and a combination of the printing paper 42 which is an output medium of the photoprint and the ID tag (identification medium) 41 is mounted as the printing paper unit 40 on the printer unit.

When the printer 34 receives from the control device 50 image data of an image for printing to be outputted, the printer 34 prints out the image data on the printing paper 42. As the printer 34, a sublimatic printer is used, for example. Note that, in the case where the sublimatic printer is used, not only the printing paper 42 and the ID tag 41 but also the submaric printer-use ink film, which are delivered on the set, are mounted on the photographing and printing device 1.

The ID tag reader/writer 33 reads out various kinds of identification information stored in the ID tag 41 and outputs them to the control device 50. The ID tag 41 is composed of an IC chip having a memory function, and others. Examples of the identification information include unique IDs, the number of papers, and the type of a paper, and color information inherent in the ink (in the case where the ink film is mounted together).

The control device 50 determines in accordance with the identification information that has been read out by the ID tag reader/writer 33 whether the printing paper 42 and the ink film mounted are available for the photographing and printing device 1, and the control device 50 makes the printer 34 operable only in the case where they are available. That is, it is set so that the photographing and printing device 1 cannot use other printing papers and ink films than the printing paper 42 and ink film specified for the photographing and printing device 1.

Further, by counting papers every time the printing paper 42 is used, in accordance with the information on the number of papers which is stored in the ID tag 41, it is possible to keep track of the number of remaining papers. Therefore, the arrangement in which displaying means or other means give a warning when a low paper condition develops makes it possible to avoid such a problem that a paper-out condition occurs during use by the users. Note that, when the papers are counted, the information on the number of papers, which is stored in the ID tag 41, is also updated. With this arrangement, in the case where a paper-out condition occurs, the information on the number of papers, which is stored in the ID tag 41, is also updated to be zero, resulting in the invalidity of this ID tag 41.

Further, by reading out information on the type of paper and the color information inherent in the ink, which are stored in the ID tag 41 to correct color elements for image data according to the foregoing information, it is possible to output proper images to the paper and ink film.

As the ID tag 41, there are the following types of ID tags: a non-contact type ID tag which allows data communication via radio waves and a contact type ID tag which is provided with a terminal. The ID tag reader/writer 33 is the one that support either or both of the ID tags.

Note that, in the above example, although the ID tag 41 is used to check whether the printing paper 42 is available, checking is not limited to this manner. For example, it may be arranged in such a manner that checking is carried out using a bar code which is printed on a packing material for packing the printing paper 42 and the ink film. However, the bar code would cause problems that the amount of information is limited to be included therein, and that it is impossible to update information by counting of the papers, for example.

Note that, the printing paper 42 may be a paper sheet as a usual paper medium, or a sticker which is composed of an adhesive sheet or a peel-off sheet which is stuck to the adhesive face of the adhesive sheet.

The following will explain details of the control device 50. In the photographing and printing device 1, as shown in FIG. 1, the control device 50 is provided with a mood creating device control section 51, an image editing section 52, a mode selecting section 53, a user status detecting section 54, and a device status detecting section 55.

The mood creating device control section 51 controls equipment (mood creating device) which is provided in the photographing and printing device 1 so that the mood creating device can make operations necessary for photographing and editing, as well as so that the mood creating device can create some mood in accordance with a selection mode in the photographing and printing device 1. Here, examples of the mood creating device include not only the lighting device 17 and the speaker 18, but also user interface devices such as touch panels 13 and 21 and gadgets such as backgrounds for photography, curtains, and touch pens 22.

More specifically, the mood creating device control section 51 controls the lighting device 17 (17a through 17d in FIGS. 2 and 3), for example, so that the lighting device 17 can shine light under a usual state and flashlights during photography. Further, mood creating device control section 51 controls the lighting device 17 in accordance with a selection mode so that the lighting device 17 can create some mood in the photographing and printing device 1. Also, the mood creating device control section 51 controls the speaker 18 (speakers 18a through 18d in FIGS. 2 and 3), for example, so that the speaker 18 can make voice guidance for operations. Further, the mood creating device control section 51 controls the speaker 18 in accordance with a selection mode so that the speaker 18 can create some atmosphere in the photographing and printing device 1. Moreover, the mood creating device control section 51 can switch backgrounds for photography, curtains, and touch pens 22 in accordance with a selection mode.

The mood creating device control section 51 is further provided with a user interface control section 51a for controlling user interface (user interface means) such as touch panels 13 and 21 and speaker 18.

The user interface control section 51a controls the foregoing user interface in accordance with a selection mode. More specifically, the user interface control section 51a causes the user interface to present various messages and images in the photography processing and decoration processing, in accordance with a selection mode. Especially, in the image editing processing such as decoration, the user interface control section 51a causes the touch panel 21 to display e.g. an image to be edited and various editing tools (operating means) in editable forms in response to a request from the image editing section 52.

Thus, under the control of the user interface control section 51a, the user interface presents an operating screen, voice guidance, and others in the form corresponding to the selection mode, so that an mood corresponding to the selection mode is created in the photographing and printing device 1.

The image editing section (image editing means) 52 has functions of performing image editing in accordance with the selection mode with respect to a photograph image of a user which is photographed by the camera 12 and generating an image for printing. Further, the image editing section 52 causes the user interface including the touch panel 21 and the speaker 18 to present operating means such as graphical user interface (GUI) for the user using image editing functions that the image editing section 52 itself have. More specifically, the image editing section 52 performs display of pictures associated with the selection mode (background, menu, stamp, and others), reproduction of sound effects, color control for printing, and others. Note that, a mode change instruction, which is inputted from the operation screen displayed on the touch panel 21 by the image editing section 52, is acquired by the mode selecting section 53, and the selection mode becomes definite.

Further, the image editing section 52 is provided with a secret picture adding section 52a. Note that, the secret picture adding section 52a will be explained later.

The mode selecting section (mode selecting means) 53 selects one mode as a selection mode among from a plurality of modes which are set in advance, in accordance with the acquired mode selection information, and inputs it to the mood creating device control section 51 and the image editing section 52. The criterion used when the mode selecting section 53 determines the selection mode in accordance with the mode selection information is stored in advance in the mode selecting section 53. Further, when receiving the selection mode from the mode selecting section 53, the mood creating device control section 51 and image editing section 52 read out the content to perform control operation in accordance with the selection mode, from a rule table set in advance in the storage device 31.

Here, the mode selecting section 53 acquires the mode selection information from the user via the user interface such as the touch panel 21. Note that, the mode selecting section 53 may acquire the selection mode from the user's direct input for designating the selection mode or may determine the selection mode in accordance with user's answers to plural questions made indirectly, for example.

Further, the mode selecting section 53 can determine the selection mode in accordance with user information detected by the user status detecting section (user status detecting means) 54 for detecting a state of the user. For example, when an image processing device for analyzing an photograph image is provided as the user status detecting section 54, the user's age and the number of users can be used as user information for the determination of the selection mode. In addition, when an odor detector is provided as the user status detecting section 54, whether the user is drunk can be used as user information for the determination of the selection mode.

Further, the mode selecting section 53 can determine the selection mode in accordance with device information detected by the device status detecting section (device status detecting means) 55 for detecting a state of the photographing and printing device 1. For example, when a timer and counter are provided as the device status detecting section 55, an operating rate of the photographing and printing device 1 can be used as device information for the determination of the selection mode. Other examples of the device information include current time, how busy in the surrounding area, operating time, temperature, humidity, and weather condition. Further, these kinds of information can be also acquired via the network from an outside detector and information providing device.

Figure 6:
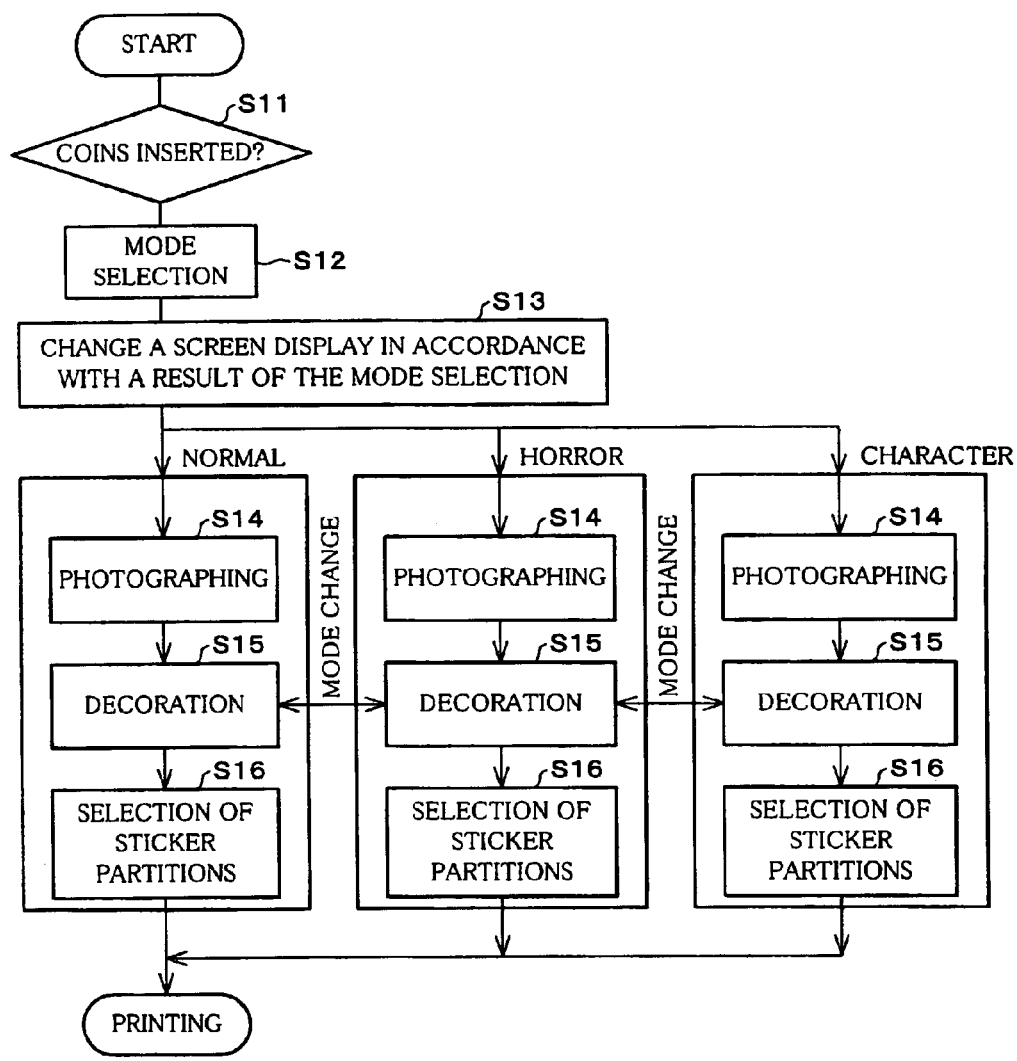
FIG. 6 is a flow chart schematically showing operations of the photographing and printing device shown in FIG. 1.

Referring to FIG. 6, the following will explain the operations of the photographing and printing device 1.

The photographing and printing device 1 begins with detection of coins inserted into the coin slot 15 and starts a play (S11). Thereafter, the photographing and printing device 1 presents the user with mode selection to acquire the input of the mode selection from the user.

Next, the mode selecting section 53 determines the selection mode in accordance with the information inputted by the user (S12). Then, in accordance with the selection mode, the operation screen of the touch panel 21 is changed (S13). Subsequently, the processing set in the selection mode (normal mode, horror mode, or character mode in FIG. 6) is performed.

Then, when a screen layout to be photographed is determined by the user, the user is photographed with the camera 12 (S14). At this moment, the photography processing corresponding to the selection mode is performed.

Next, the user decorates a photograph image on the operation screen of the touch panel 21 (S15). Here, pictures (stamps and others) available in the selection mode are displayed on the decoration screen. Note that, when the user changes the mode on the decoration screen, decorating functions and pictures are changed in accordance with the changed selection mode. The selection of modes can be acquired right after the user starts playing and during editing for decoration. Further, in accordance with the user information detected by the user status detecting section 54 and the device information detected by the device status detecting section 55, the selection mode can be changed as needed.

Finally, a sticker is produced with the number of partitions specified by the user (S16).

As described above, in accordance with the selected mode, the photographing and printing device 1 changes e.g.

display of a photography screen, display of a decoration screen, contents available on the decoration screen, sound, operation screen, photographic techniques, manner of countdown indication during photography, tempo, the number of sticker partitions, and color tone setting for printing. For example, when the selection mode is horror mode, pictures giving the user terror, creep, fear, and the like are arranged together with sound and lighting effects in accordance with an operating scene.

Since effects of the entire photographing and printing device 1 can be changed each for the selection mode in this manner, the user can play the photography processing and decoration processing in a uniform mood. Also, since the most suitable environment for decoration can be provided matching with the mood for photographing, it is possible to fully give the user a feeling of satisfaction within a limited amount of the operating time.

Referring to FIGS. 7 through 11, the following will explain a specific example of the operation screen displayed on the touch panels 13 and 21.

When the user selects a tab below the indication "Select a Mode!" with a touch of the initial mode selection screen (not shown), specific contents for the selected mode appear. When the user touches "Done", the play goes on in the selected mode.

Figure 7:
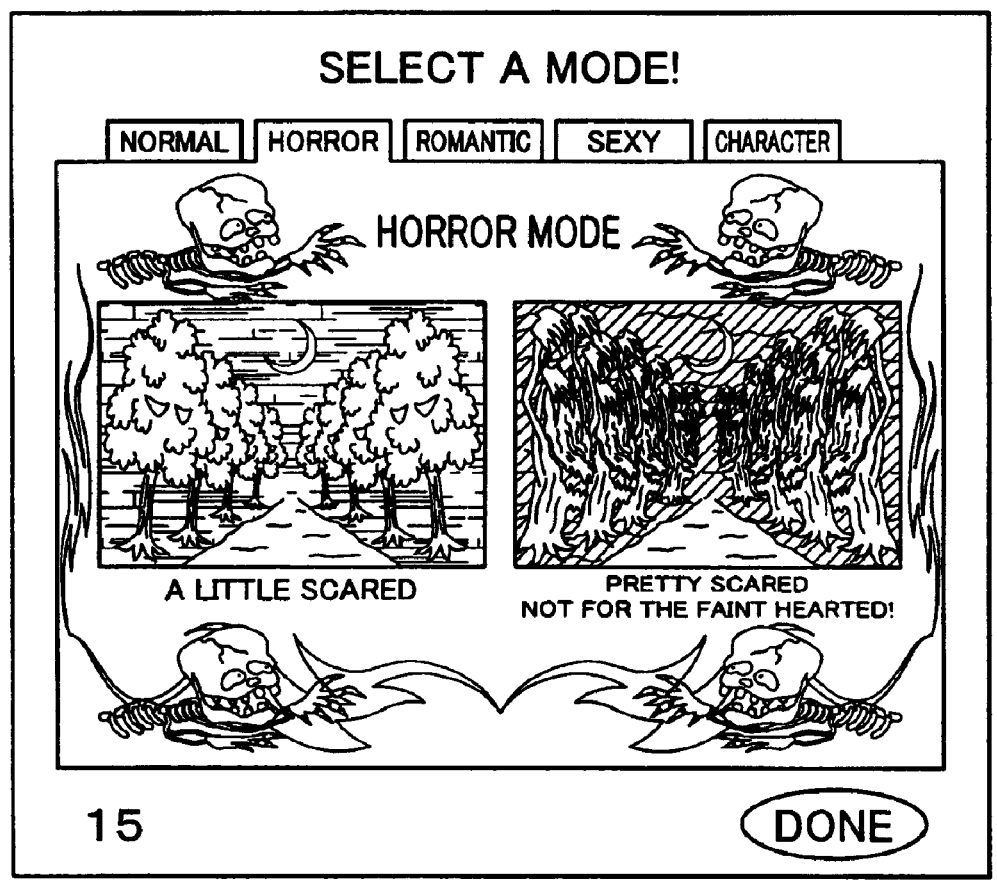
FIG. 7 is an explanatory view showing one example of a mode selection screen presented by the photographing and printing device shown in FIG. 1.

For example, in a horror mode, mode selection for horror mode as shown in FIG. 7 appears on the screen. A screen display indicating an effect of the horror mode (you will be scared) is carried out, and selection between "little scary mode" and "pretty scary mode" is asked to the user. Note that, on the mode selection screen, a time limit for operation is indicated in a subtraction manner in the bottom left corner of the screen. When the time limit goes backwards to 0, the operation is completed to go on to the next operation.

Figure 8:
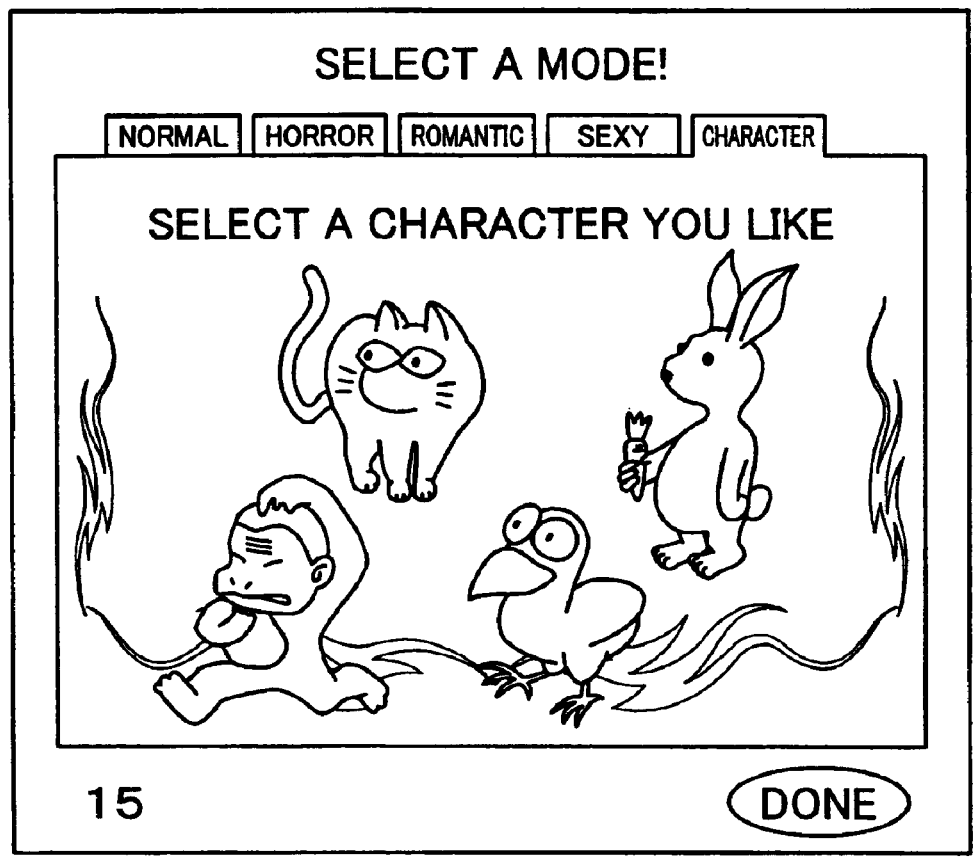
FIG. 8 is an explanatory view showing another example of a mode selection screen presented by the photographing and printing device shown in FIG. 1.

When the user selects a tab of character mode with a touch of the operation screen shown in FIG. 4, mode choices for character mode as shown in FIG. 8 appears on the screen. On this screen, a selection of favorite character is asked to the user. When the user touches a "Done" button, a photographing screen and a decoration screen are displayed with a cute picture of the character selected by the user.

Figure 9:
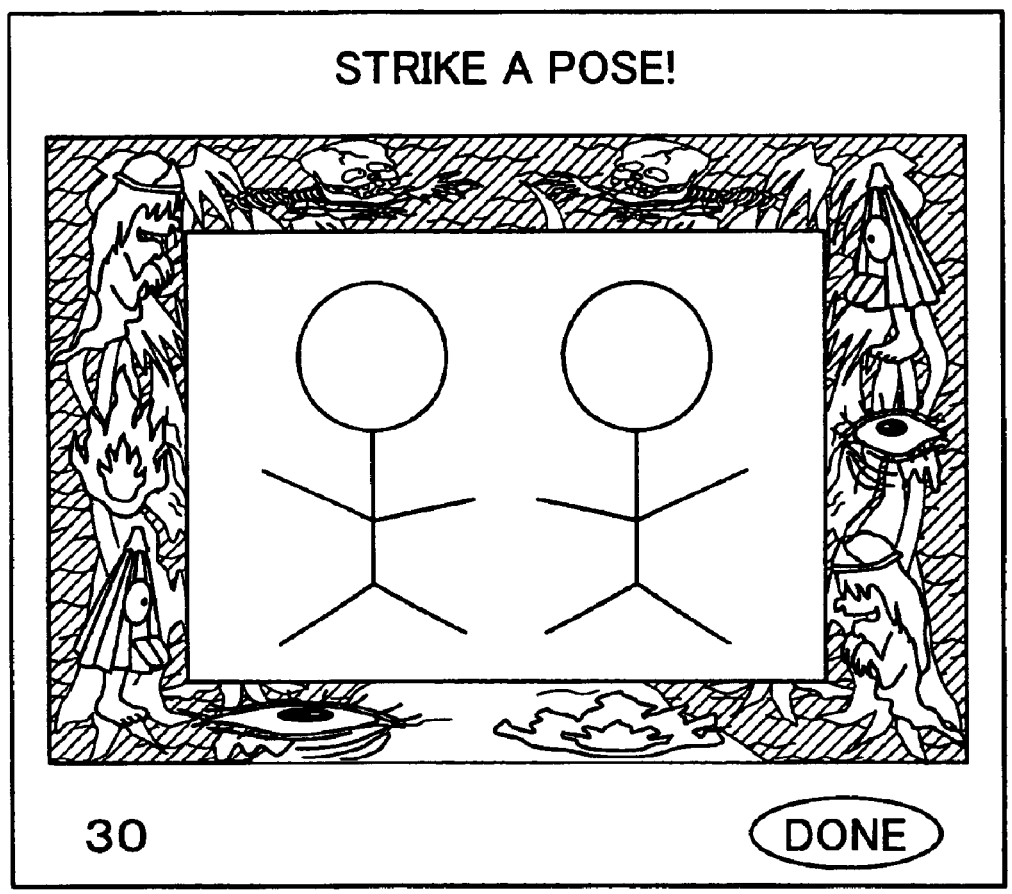
FIG. 9 is an explanatory view showing one example of a layout check screen presented by the photographing and printing device shown in FIG. 1.

FIG. 9 shows an example of the photographing screen in the horror mode. The photography processing begins with a selection between a full-length photography, i.e. photography with a layout that almost full-length of the user is covered and a close-up photography, i.e. photography with layout that a lot of detail of a user's head and chest region is covered. This selection is carried out by the user with a touch of the touch panel 13.

After the selection of layout, a screen for confirming the selected layout is displayed as shown in FIG. 9. When "Done" button is touched, photographing is carried out with the camera 12. Note that, the photographing is carried out in the following sequence of events: a state of photographing is displayed through the camera 12 on the touch panel 13; a shutter release instruction is given when the user decides a pose; and a shutter is released after completion of countdown indication.

For example, in the horror mode, as shown in FIG. 9, pictures of ghost and the like are used in the operation display to give the user a feeling of fear. Note that, on the photographing screen, a time limit for the operation is indicated in a subtraction manner in the bottom left corner of the screen. Before the time limit goes backwards to 0, the user can touch a "Start Photographing" button to photograph. Note that, it is preferable that the remaining time is indicated not only in figures, but also by e.g. analog clock-like picture and circle graph in which the remaining time can be perceived visually.

Figure 10:
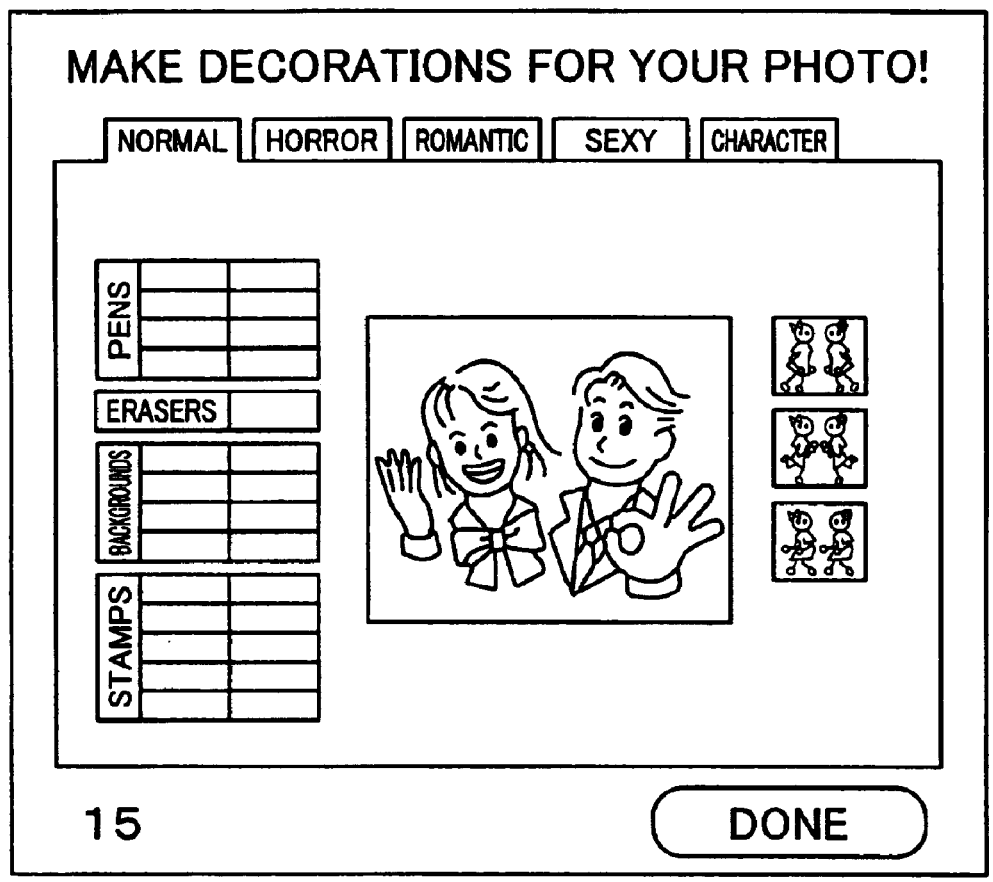
FIG. 10 is an explanatory view showing one example of a decoration screen presented by the photographing and printing device shown in FIG. 1.

FIG. 10 shows an example of the decoration screen in the normal mode. In the decoration processing, the user performs editing for decoration using "Pen" menu and "Stamp" menu, etc., which are displayed on the screen. Note that, display image on the decoration screen is determined in accordance with the mode selection at the start of playing. However, a mode change may be carried out with a touch of "normal", "horror", "romantic", "sexy", or "character" tab in the upper part of the screen. That is, on the screen for decorating operation, for example, the selected mode can be changed again with a touch of the button, so that decoration can be made on a different screen and with different items for decoration.

The decoration processing will be explained with reference to a display screen in the normal mode (in FIG. 10). Note that, the decoration processing is performed in the decorating room R2. Accordingly, in the case of the photographing and printing device 1, a display screen in the decoration processing is displayed on the touch panel 21 (in FIG. 3).

As shown in FIG. 10, in the decoration processing, an image to be edited is displayed in the center of the display screen, and the decoration processing, e.g. stamping is performed with respect to this image, using the touch pen 22. On the left of this image displayed is a selection area of tools for performing the decoration processing. Examples of the tools include pens of plural types and their colors, eraser, plural background patterns and their colors, and plural stamps.

Further, on the right of the image to be edited displayed are selection images among which an image to be edited is selected, i.e. images among which an image to be edited is selected for decorating and printing. The user can change the image displayed as an image to be edited in the center of the screen with a touch of any of these images using the touch pen 22.

Still further, in the bottom left corner of the display screen displayed is the remaining time of the time limit that is available minutes for the decoration processing. Note that, the decoration processing is completed when the time limit for the decoration processing is up, or when the user inputs the completion of editing (touching of "Done" button). Then, an exit instruction for guiding the user to wait for the completion of printing outside the decorating room is displayed on the screen. This causes the user to move in front of the print ejection port 19 after the completion of the decoration processing.

Figure 11:
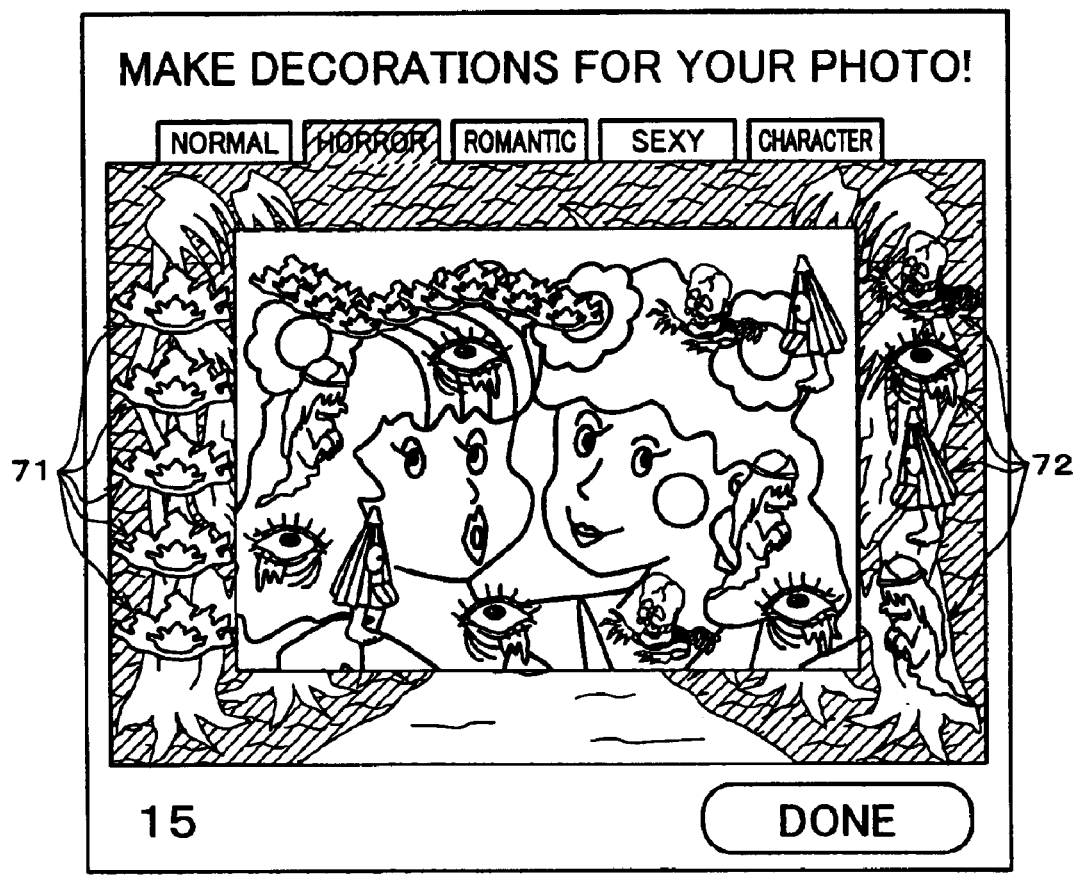
FIG. 11 is an explanatory view showing another example of a decoration screen presented by the photographing and printing device shown in FIG. 1.

FIG. 11 shows an example of the decoration screen in the horror mode. The user performs editing for decoration with pens selected by clicking on fireball-shaped icons (operating means) 71 on the left side of the screen and with stamps selected by clicking on a skull-shaped icon, eye-shaped icon, and other horror icons (operating means) 72 on the right side of the screen.

More specifically, the decoration screen in the horror mode has a display screen related to a theme of horror, and selectable are stamps of fireball, corpse candle, tombstone, and the like, a rolling stamp of a walking zombie, scenes of graveyard, ghost town, hell, ruins, and the like. For example, in the case where fireball is selected from a stamp menu, a fireball is placed when the user touches the pen on the screen. When the user keeps touching the pen on the screen, the user can obtain display effects, e.g. a fireball burning with great fury and a dying fireball. When the user takes the pen away from the screen in exact timing with a fireball burning in a way the user likes, the fireball is reflected in the edited screen. As to the pen or rolling stamp, when the user selects the contents of fireball, draws a line with the pen on the screen, and takes the pen away from the screen, a fireball appears at the end point of the line. The user can render a formless image with such an effect that the fireball is floating from the start point to the end point of the line.

Here, as to designs of the stamp, pictures composed of letters (words) related to the selection mode may be selectable. The letters related to the selection mode may be, for example, names of selection modes (horror, fantasy, etc.) and words associated with the selection mode. In the horror mode, examples of the words associated with the selection mode include "Oh woe is me!", "Cold . . . ", "Nooo . . . ", and "Help meee!". Meanwhile, in the romantic mode, examples of the words include "We are a Lovey-Dovey Couple", Happy", "Smack!", "We are in love", and "We are Madly in Love!" Thus, letters containing the words associated with the selection mode are superimposed by stamping on the photograph image to produce the composite image, thus emphasizing expressions in the image and user's state of mind (a feeling of happiness, fear, etc.).

Of course, the pictures of the letter stamp related to the selection mode are stored in advance in the storage device 31 in accordance with the selection mode. Also, the pictures of the backgrounds that the user can select on the decoration screen are stored in advance in the storage device 31.

Further, for example, in the character mode, e.g. fairy tale or cartoon mode, contents of romantic scenes such as beautiful starry sky, stars with the moon and planets, constellations, and planetarium are selectable for the background picture on the decoration screen. Such display effects as spangled stars like the Halley's comet may be provided along a line drawn with the pen.

Further, in a season mode including a mode of snow country, such effects as a skier skiing down and a white snow line left after a snowman rolls over may be provided along a line drawn with the pen. Moreover, the mode of snow country may have such an arrangement that with sounds of snowstorms as background music, snow lying thick covers buttons in the operation screen, and operations are impossible to perform unless the snow is cleared away with the pen to show the buttons up. In addition, it may have such an arrangement that when the time limit for the operation is near, an instruction by voice, e.g. "Operate properly! Don't sleep or you'll die!" is announced.

Still further, in the mode of African animals, it may have such an arrangement that with sounds of African animals and music of African natives, a sound of elephant, "pao - - - n" is reproduced in accordance with an operation, e.g. touch of a button. Moreover, it may have such an arrangement that animal-shaped stamps can be selected in decorating, and upon placing an animal-shaped stamp on the screen, a sound of the animal is reproduced. In addition, it may have such an arrangement that when the time limit for the operation is near, with "roars of a lion taking aim at his prey" gradually getting loud and clear such an image as a lion with mouth wide open looking ready to eat the user is displayed on the screen.

Yet further, in the mode of nature, e.g. mode of sea, a crab moving sideways and a flying sea gull may appear when a rolling stamp is affixed in the screen, and a sailing ship leaving a track with waves behind it may appear along a line drawn with the pen. In addition, as to the track with waves, an actually filmed picture showing texture of waves may be superimposed on the photograph image.

Note that, for the realization of a composition of a photograph image and a background picture, for example, figures extracted from the photograph image by a process, e.g. chromakey are combined with the background picture. Moreover, in the processing for combining a picture such as stamp with a photograph image, the picture can be combined in a semi-transparent form as follows: for example, in the mode of sea, a high part of waves as a foreground picture using white color may be combined with the photograph image as a background picture in such a manner that the other part of waves gradually melts away into the background picture. In the horror mode, it may have such arrangement that the outline part of a human-shaped picture expressed with white color is combined with the photograph image in such a manner that the other part of the picture gradually melts away into the photograph image, thus bringing about such display effects as a spirit or ghost appeared in the image. In addition, the photograph image may be combined with the background picture in such a manner a lower part of the photograph image gradually melts away into the background image, thus bringing about such display effects as so-called spirit or ghost appeared in the image.

For creating a good horror mood, the following control operations are provided in the horror mode. Changing e.g. a way of lighting in accordance with sound makes it possible to take a photo of the user looking frightened. Specifically, the photo of the user is taken in the state where with sound, lighting, and screen display simultaneously working with one another, lighting (elevation angle lighting device 17*c*) is directed from the bottom up when the user's fear and terror seems to reach the climax. This is an application of lighting effects that someone shines a flashlight on his face from under the face saying "Boo!" to make others frightened.

Further, setting sounds of kinds of crickets as BGM creates a mood of midnight in a graveyard. Randomly repeating turn-on/off of the light together with a voice, e.g. "Oh woe is me!" can make the user feel as if a ghost turns off the light. In addition, swinging an old lamp bulb with a shade hang over the ceiling can give the user poltergeist-like phenomena.

Still further, in synchronization with sounds, an image looking as if the display is shaking, black-colored image looking as if the display is turned off, image looking as if the display falls down like a signboard, image of blood splash, and image looking as if the display melts like an ice cream may be displayed on the operation screen. When a process moves on to the photographing stage and the decorating stage, sound effects of a door open and close in an old mansion ("Ghee-eee . . . Bang!") may be produced.

Yet further, before a process moves on to the next operation stage, sound effects of zombie's footsteps coming close ("Click, click, click" and "Thumpity-thump") may be outputted from a speaker (rear speakers 18*d*) so as to become louder as the time limit for decoration approaches, and an image of a zombie being about to attack may be displayed on the screen when the time limit is up. In addition to displaying images and menu, effects of lighting and sound, e.g. suddenly turning off the light and playing a voice of intoning a sutra may be used at the same time, thus creating a much better horror mood.

Further, in the horror mode, an image with a more bluish hue may be printed out.

Here, the photographing and printing device 1 may make the user to select and determine a plurality of modes and their execution sequence all at once in the mode selection screen, and may carry out photographing of each mode in accordance with the determined execution sequence.

The processing in this case is specifically performed in the following flow. Note that, the following description assumes that there are five selectable modes: normal mode, horror mode, romantic mode, sexy mode, and character mode.

The photographing and printing device 1 first detects whether coins are inserted into the coin slot 15 and starts a service when the coins inserted are detected. Thereafter, the photographing and printing device 1 urges the user to select modes from a list of five modes displayed on the screen, so as to acquire the input of mode selection and execution sequence from the user. At this moment, the mode selecting section 53 determines the selected modes and their execution sequence in accordance with the information inputted by the user. Here, it is assumed that the user selects three modes in a user-desiring order among from five modes.

Next, the control device 50 performs the photography processing in each of the selected three modes (S14) in sequence. Upon completion of photographing in all the specified modes, decoration (S15) and selection of sticker partitions (S16) are carried out in this order (in FIG. 6). Note that, the details of each processing are as described above with reference to FIGS. 6 through 11.

In the case where processing in the plurality of modes are performed all at once in this manner, the user interface control section 51a displays thumbnails of photograph images in the respective modes so that the user can select a photograph image for decoration. With this arrangement, the user appropriately make a selection among from thumbnails of the respective photograph images in the presented three modes so as to perform decoration processing with respect to the photograph image in the user-desiring mode, using facilities such as pen and stamp.

For example, the screen for image editing may be arranged so that when the user makes a selection, using a touch pen, among from thumbnail images of plural photograph images displayed on the screen, the selected photograph image is displayed in a magnified form in the center of editing area to be subjected to editing. With this arrangement, the user can select a desired image among from plural photograph images in an efficient manner.

Further, a name of the mode at the time of photographing may be displayed together nearby thumbnail images and the enlarged photograph image for decoration. This arrangement can remind the user of what mode the user has photographed in, thus facilitating a flow of the decoration processing.

In addition, the photographing and printing device 1 may permit the user to repeatedly perform the mode selection processing and the photography processing for a predetermined number of times. With this arrangement, the user can select a different mode for each of the plural times of photographing. This allows the user to enjoy a different mood every time the user photographs, thus increasing a range of service and enhancing the satisfaction of the user. Note that, in the case where the user selects a different mode for each of the plural times of photographing, thumbnails of photograph images in the respective modes can be also displayed at the time of the decoration processing so that the user can select a photograph image for decoration.

As just described, in the case where plural modes are included in a single play, the photographing and printing device 1 causes the storage device 31 or a memory (not shown) of the control device 50 to store photograph images with information, associated with the photograph images, for identifying modes in which the photograph images are photographed (e.g. names of modes). Further, in the case where thumbnail images are stored in the storage device 31 or the memory of the control device 50, they are stored with the respective modes at the time of photographing, associated with the thumbnail images. With this arrangement, what modes the photograph images and thumbnail images are photographed in can be displayed on the decoration screen. Therefore, for example, when the user selects a desired image among from thumbnail images, the user interface control section 51a can appropriately change and display pictures (pen, stamp, background, etc.) and effect screen image in accordance with the mode at the time of photographing. Consequently, pictures related to a mode can be placed on an edited image in an effective manner, thus maintaining a high satisfaction of the user.

It might be possible that the user is not satisfied with any modes even if the user photographs with a mode change for plural times. In order to overcome this problem, the photographing and printing device 1 may be provided with buttons, e.g. "Skip to Next Mode" and "Go back to Normal Mode" on the mode selection screen, photographing screen, decoration screen, and others so that if "Skip to Next Mode", the process goes to the next mode, and if "Go back to Normal Mode", the process goes back to the step for user selecting modes for plural times of photographing. This makes it possible to meet a wide range of needs from the user, thus enhancing the satisfaction of the user.

Next, as a specific example of the user status detecting section 54, the following will explain the case of guessing the age of a user. It may be arranged so that the user status detecting section 54 performs image processing with respect to a photo of the user taken before or after the user inserts coins and guesses user's age from the image showing user's height and face, and the mode selecting section 53 determines selectable guide displays in accordance with the result of guessing. This can create an atmosphere in accordance with a user's age group.

More specifically, the user status detecting section 54 estimates the user's age from a height of a photographic subject shown in the image and performs a mode change in accordance with the estimated age. For example, in the case where the user is recognized as a child, mildly flickering lights and images on the screen with bright lighting in the room are provided to prevent the user from suffering from epileptic seizures. Also, instead of a mode which is too extreme to children, e.g. horror mode, characters for children are arranged available on the screen. Further, in the case where users are recognized as an adult couple, songs or tunes for enhancing a lovey-dovey mood are played in the background, and contents for enhancing a lovey-dovey mood, e.g. heart and cupid-shaped items are arranged so that the users can select on the decoration screen. Further, in the case where the users are recognized as a family group, a mode containing extreme expressions may be arranged unavailable, and instead, a general mode, e.g. character mode with rich contents is displayed on the screen.

Next, the following will explain a specific example of the device status detecting section 55.

Mounting a clock as the device status detecting section 55 allows the photographing and printing device 1 to change a display at a preset time. In general, it is likely that types of users (age group of users) who use the photographing and printing device 1 vary depending on hours of the day, i.e. morning, daytime, evening, and night. Therefore, available modes may be changed to create the best suitable atmosphere corresponding to a type of users in each hour of the day, thus attracting a strong attention of users.

For example, the following description assumes that the photographing and printing device 1 is installed at a shop in entertainment districts. In the morning, instructions with a dull voice in the mode of "hangover" are outputted with normal images in a regular mode on the screen. In the daytime through evening, normal images and voices are outputted in a regular mode. In the night, images and voices matching an atmosphere around the shop in the mode of "entertainment districts of night" are outputted as if "neon-glittering streets" in Las Vegas. Note that, according to an installation location of the photographing and printing device 1 and hours of the day, a shop operator can change an image display, voice, and contents for decoration so as to match an atmosphere around the shop and hour of the day.

Further, mounting timer and counter as the device status detecting section 55 makes it possible to change a mode in accordance with an operating rate of the photographing and printing device 1. Specifically, in the case where an average time period of the time after one user uses the device before a next user uses it (unoccupied minutes) is obtained by the device status detecting section 55 is below a time period preset, for example, by the maintenance facility, the device status detecting section 55 determines that the operating rate of the device is high, resulting in the change of images on the screen.

For example, in the case where an operating rate is high, on the demonstration screen such a character as shopkeeper of a greengrocer's says in a brisk voice, "We have a lot of customers today. Thanks!" A busy state is created with flashing lights in the photographing room R1 and the decorating room R2. In addition, on the operation screen, images with a color of energetic image (orange or other color) are displayed to make an "aggressive" impression on the user. On the other hand, in the case where an operating rate is low, on the demonstration screen such a character as lady at a bar says in a voice sounding as if she urges to go in, "We have few customers today. Please stop by, sir!". In addition, on the operation screen, muted colors are displayed.

Further, the photographing and printing device 1 may set information for changing the arrangement of the screen for editing, using a maintenance facility. The photographing and printing device 1 has the maintenance facility for checking operations of components (camera, display device, and printing device) and for checking and changing settings of time length and number of times for one play (time length of the operation for photography, number of times for photography, and time limit for decoration).

This maintenance facility is included as standard equipment in almost all photographing and printing devices. A usual photographing and printing device has an arrangement in which internal devices can be subjected to maintenance with a door for maintenance and inspection, which is provided at the front or side surface of the device, open. In the maintenance facility of the photographing and printing device 1, "Free-charge PLAY Button" for a check of operations and "Maintenance Button" for activating the maintenance facility are provided. When a power of the device is turned ON, hardware starts working before software is activated. Thereafter, software in the device displays a screen of waiting for user's insert of coins (generally, demonstration screen). In this screen, with a push of the "Maintenance Button" by a store person, software for maintenance facility is activated and the maintenance facility becomes available.

The photographing and printing device 1 may store control information on settings of modes and other information therein so that a store manager can change the information as needed using the maintenance facility. Usually, after a lapse of several months from installation of a new device, the user loses interest in unchanged functions of the photographing and printing device 1, and the unchanged functions causes a decrease in the number of users. With the above arrangement that allows a change of settings, appearance of the screen can be changed. This can prevent a decrease in the number of users due to unchanged functions.

Note that, the present embodiment is not intended to limit the scope of the present invention, and various modifications are possible within the scope of the present invention. For example, the present invention can be arranged as follows.

The photographing and printing device 1 of the present invention changes e.g. voice, operation screen, photographic techniques, manner of countdown indication during photography, tempo, the decoration screen, contents for decoration, and the number of sticker partitions for each mode.

The photographing and printing device 1 may include fundamental components: (a) means for operating an photographic operation; (b) means for photographing a photographic subject by the means (a); (c) means for shining lights on the photographic subject; (d) means for editing a photograph image that has been photographed; and (e) means for printing out an edited image of the photographic subject on a predetermined printing medium, and the photographing and printing device 1 may further include (f) means for receiving information for determining a screen layout from a user (means for selecting a mode in which the user plays; (g) means for changing information to present for the user on a screen for editing in accordance with the received information (means for changing a display of a decoration screen and contents in accordance with a mode selected by the user); and (h) means for changing a content for processing in accordance with the changed screen.

With this arrangement, when the user selects a mode, functions and arrangement for decoration can be changed in accordance with the selected mode. Therefore, in a limited operation time it is possible to provide the user with the best suitable decoration environment for a mood for photographing, thus enhancing the satisfaction of the user.

Further, the photographing and printing device 1 may acquire information for changing a screen layout for decoration right after starting a play. The photographing and printing device 1 may acquire information for changing a screen layout for decoration during editing for decoration. The photographing and printing device 1 may acquire information for changing a screen layout for decoration from an image of a photographic subject. The photographing and printing device 1 may set information for changing a screen layout for decoration by means of maintenance facility. The photographing and printing device 1 may change a screen layout for decoration in accordance with time information. The photographing and printing device 1 may print out an edited image of the photographic subject on a photo sticker sheet. The photographing and printing device 1 supplies a printing medium from a printing medium unit including a printing medium on which an image is printed out and an identification medium in which stores identification information on printing medium, and the photographing and printing device 1 may have identification means for identifying a printing medium in accordance with the identification information stored in the identification medium.

Still further, in a photographing and printing device of the present invention, the mood creating means may include user interface means for user operating the photographing and printing device. In addition, in a method for controlling a photographing and printing device of the present invention, user interface that the user uses to operate the photographing and printing device may be controlled in accordance with a selection mode in the mood creation controlling processing.

With the above arrangement and method, the photographing and printing device can further provide user interface, e.g. operation screen and guidance voice in accordance with a selection mode. Therefore, it is possible to provide the user with an operation environment of a uniform atmosphere in the photography processing and image editing processing.

Further, in a photographing and printing device of the present invention, the image editing means may realize operating means for user using image editing functions for editing a photograph image by means of the user interface means. In addition, in a method for controlling a photographing and printing device of the present invention, operating means for user using image editing functions for editing a photograph image may be realized by means of the user interface in the image editing processing.

With the above arrangement and method, in the image editing processing the photographing and printing device can further provide operation means e.g. operation screen and guidance voice that the user uses to edit a photograph image, in accordance with a selection mode. Therefore, it is possible to provide the user with an operation environment of a uniform atmosphere. For example, it is possible to change for each mode the operation environment by changing a menu display of the image editing processing and functions and content for image editing (image such as stamp). Therefore, it is possible to select present functions and content matching an atmosphere among from various kinds of functions and content, thus providing the user with a comfortable environment for image editing in a limited operation time to enhance the satisfaction of the user.

Yet further, in a photographing and printing device of the present invention, the mode selecting means may determine a selection mode in accordance with input of the user. In addition, in a method for controlling a photographing and printing device of the present invention a selection mode may be determined in accordance with input of the user in the mode selecting processing.

With the above arrangement and method, the photographing and printing device can determine a selection mode in accordance with input of the user. Here, in the case where the user directly inputs the mode selected by the user, the user can use a photographing and printing device in an atmosphere specified for the selected mode. In addition, for example, in the case where the user inputs answers to a plurality of indirect questions, it is possible to provide a story line in the operation and atmosphere of the photographing and printing device.

[Second Embodiment]

Another embodiment of the present invention will be explained below with reference to FIGS. 12 through 16. Note that, the present embodiment is applicable to the aforementioned First Embodiment. Therefore, for the purpose of explanation, members having the same functions as those described in the First Embodiment are given the same reference numerals and explanations thereof are omitted here. In addition, the following description assumes that terms defined in the First Embodiment are used as they are in the present embodiment unless otherwise specified.

Conventionally, the photographing and printing device such as photo sticker venting machine creates an image for printing by writing letters and patterns with a touch pen and affixing pictures stored in advance as if stamping with respect to an image of the user photographed by a camera. Such a photographing and printing device is needed to have a high quality image as well as the element of amusement in the process of photographing and decoration.

However, in the conventional photographing and printing device, the user edits while checking a printed image of pictures on the screen. Therefore, the conventional photographing and printing device lacks the element of surprise, e.g. user's checking an edited result for the first time after printing.

In view of the above problem, the photographing and printing device 1 of the present invention does not completely present a printed image to the user during image editing so as to allow the element of surprise when the user sees the printed image after printing. Therefore, the photographing and printing device 1 can add the element of surprise to its service, thus preventing the user from losing interest in the photographing and printing device 1 and attracting the user to repeatedly use the photographing and printing device 1.

In order to achieve the above object, the photographing and printing device 1 is provided with a secret picture adding section (secret picture adding means) 52a especially in the image editing section 52. The secret picture adding section 52a performs secret picture adding processing for adding a secret picture without prior presentation to the user to an image for printing.

Specifically, the secret picture adding section 52a obtains the position where a secret picture is added to an image for printing in accordance with input of the user via the touch panel 21 on the decoration screen. This allows the user to place the secret picture at a desired position, thus adjusting a position relationship with e.g. other stamp. Note that, the position where the secret picture is placed may be determined in advance. Further, in the case where the user places a few stamps, a picture which is not inputted by the user during editing may be added to an image for printing. Besides, a content of the added secret picture may not be displayed until it is printed out, or may be displayed, for example, with animated characters and sound effects in the state where any change by the user is prohibited after the content of the added secret picture is determined.

Figure 12:
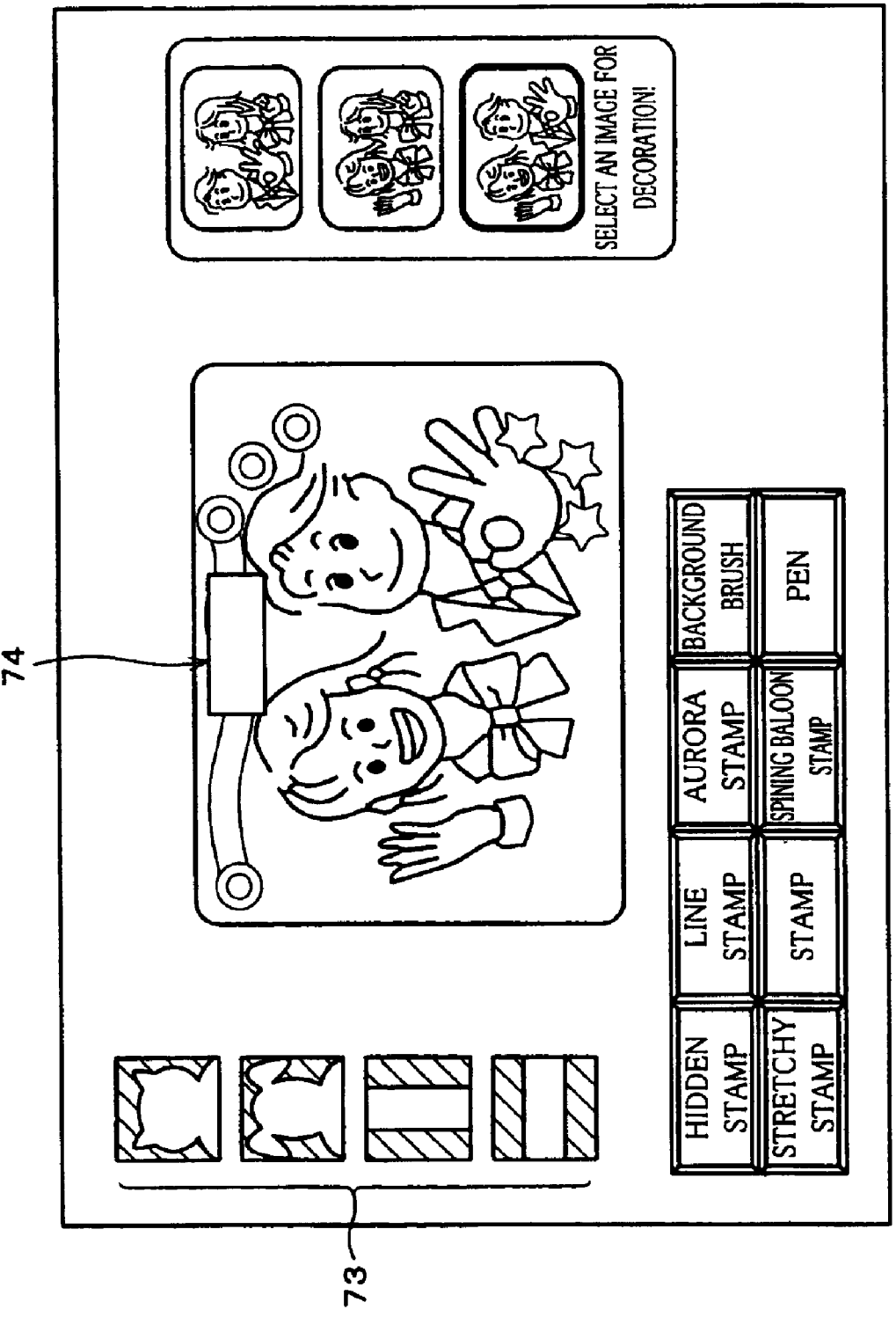
FIG. 12 is an explanatory view showing one example of a secret picture positioning screen presented by the photographing and printing device shown in FIG. 1.

FIG. 12 is an example of an image display in "hidden stamp" mode of the photographing and printing device 1. As shown in FIG. 12, in the "hidden stamp" mode a selectable plurality of hidden stamp buttons 73 are displayed on the operation screen. The hidden stamp button 73 can be displayed so that only its outline, for example, can be seen. The user selects this hidden stamp button 73 and arranges a region setting frame 74 inside an editing area, which sets the position of the hidden stamp (secret picture) on the image for printing.

Here, a hidden stamp, which is an outline picture 75 associated with a plurality of candidate pictures 76, is stored in the storage device 31. Note that, the outline picture 75 may be associated with one candidate picture 76.

When the image editing section 52 determines the image for printing at the end of the decoration processing, the secret picture adding section 52a selects one of the candidate pictures 76 and replaces the outline picture 75 with the selected candidate picture 76. Note that, the secret picture adding section 52a may determine the candidate picture 76 in accordance with a criterion, e.g. random number alone or selection mode. In addition, as to the hidden stamp button 73 displayed on the operation screen, buttons selected in accordance with the selection mode selected by the mode selecting section 53 may be displayed. This enables to select and print a secret picture matching an atmosphere of the photographing and printing device 1 in accordance with random number, time, user input history of, device operation history, and sensor-acquired information, for example.

Figure 14:
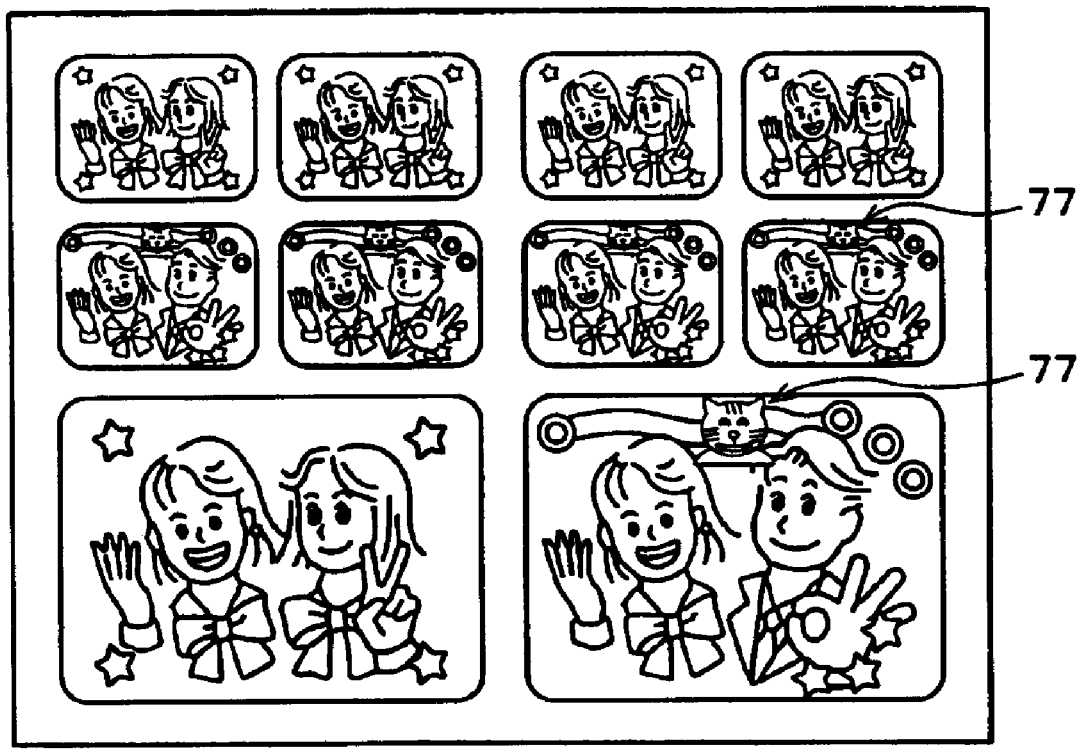
FIG. 14 is an explanatory view showing one example of a print result with an added secret picture by the photographing and printing device shown in FIG. 1.

FIG. 14 is an example of a printed image to which a secret picture is added. In FIG. 14, a stamp 77 is a secret picture added by the secret picture adding section 52*a*. Here, the secret picture may be added to stickers of all photograph images specified during editing (FIG. 14), to only stickers specified on the setting screen for sticker image (not shown), and only a specific sticker (e.g. one sticker) selected by the user or the secret picture adding section 52*a*.

Figure 15:
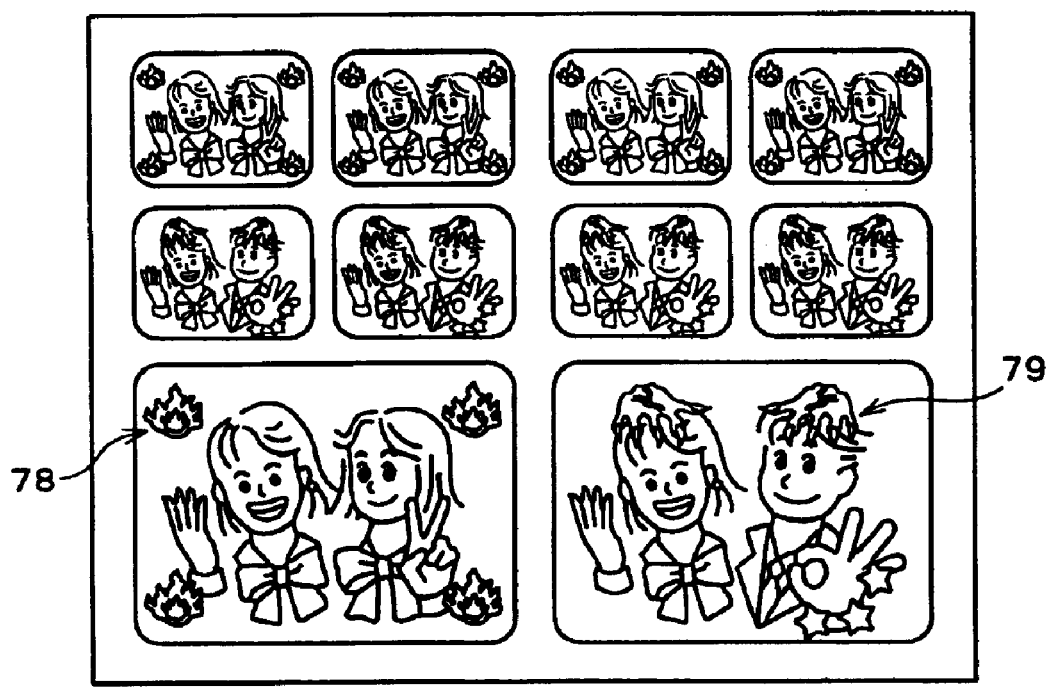
FIG. 15 is an explanatory view showing another example of a print result with an added secret picture by the photographing and printing device shown in FIG. 1.

FIG. 15 is an example of a printed image to which a secret picture is added in the horror mode. In the horror mode, a fireball-shaped picture 78 in the background and zombie's hand-shaped picture 79 superimposed on an image of a photographic subject in the foreground, for example, appear on the printed image. At this moment, by detecting a region of skin color and background color from the photograph image, a secret picture can be placed in a region except for the detected region.

Figure 16:
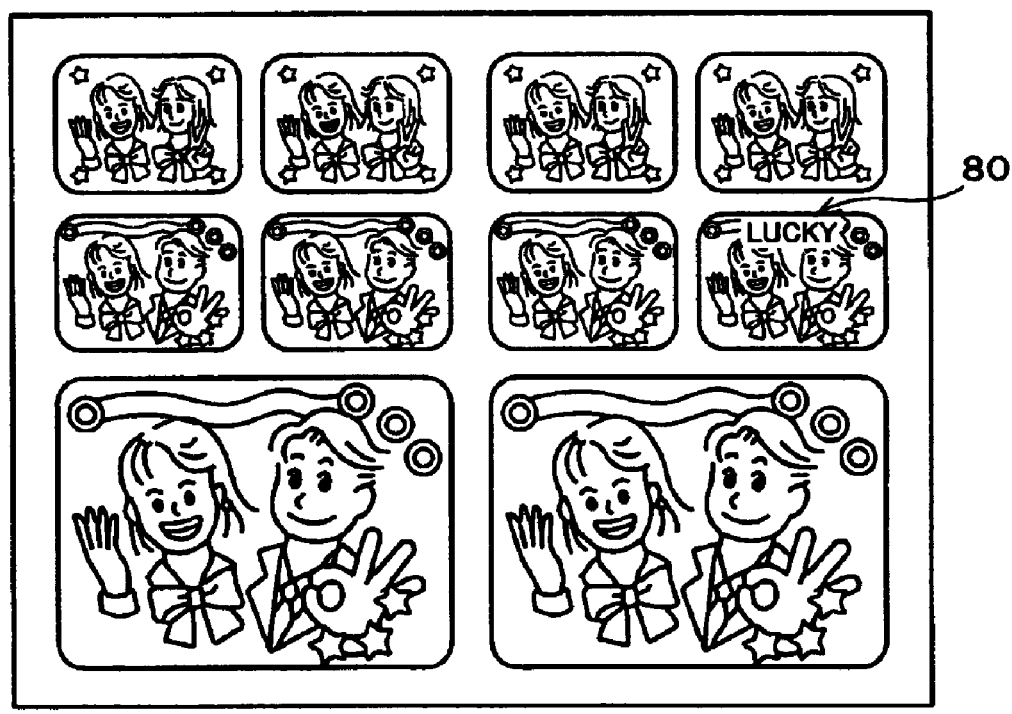
FIG. 16 is an explanatory view showing yet another example of a print result with an added secret picture by the photographing and printing device shown in FIG. 1.

FIG. 16 is an example of a printed image to which a secret picture is added in the mode of lot. In the lot mode, taking advantage of the characteristic that the user cannot select a secret picture makes it possible to provide a lottery, lot for written oracle, or compatibility analysis. Note that, as shown in FIG. 16, a "lucky" picture 80 that gives one more chance of play may be printed in a white space of the sticker, not on the image for printing. Thus, since using the lot mode makes it possible to add a function of giving a bonus, e.g. lottery to the photographing and printing device 1, a new entertainment element, the element of surprise, increases amusement, thus resulting in increase of user's desire to use the photographing and printing device 1.

Finally, the photographing and printing device 1 can be constituted based on a general-purpose computer, e.g. personal computer. That is, the photographing and printing device 1 is composed of: a CPU (Central Processing Unit) which executes instructions from a program for realizing the functions of the photographing and printing device 1; ROM (Read Only Memory) which stores a boot logic therein; RAM to run the above program; a storage device (recording medium), such as hard disk, which stores the above program and various kinds of data therein; an input device such as keyboard and mouse; an output device such as monitor and speaker; and a network connection device which connects an external network via an internal bus. For the realization of the functions of the photographing and printing device 1, the program stored in the storage device is run on the RAM as needed and executed by the CPU.

Further, in order to achieve an object of the present invention, a computer-readable recording medium which stores therein program codes (execute form program, intermediate code program, source program) in a control program for photographing and printing device as software for realizing the aforementioned functions may be supplied to a system or device, and a computer (or CPU, MPU, DSP) of the system or the device may read out and executes program codes stored in the recording medium. In this case, since program codes themselves read out from the recording medium realize the aforementioned functions, the recording medium storing the program codes constitutes the present invention.

Specifically, a predetermined program stored in a memory (not shown) of the photographing and printing device 1 is executed by a microprocessor or other device so that the mood creating device control section 51, the image editing section 52, the mode selecting section 53, the user status detecting section 54, and the device status detecting section 55, which are included in the photographing and printing device 1, realizes their operations.

The recording medium for supplying the program codes can be separated from the system or device. Further, the recording medium may be a medium which fixedly holds the program codes so as to supply the program codes. In addition, the recording medium may be mounted in the system or device so that the program codes stored in the recording medium can be directly read out by the computer, or may be inserted as an external storage device in the system or device so that the program codes stored in the recording medium can be read out via a program reading device connected to the system or device.

For example,

Here, the recording medium can be a tape medium including magnetic tape and cassette tape; a disk medium including magnetic disk such as floppy® disk and hard disk and optical disk such as CD-ROM, MO, MD, DVD, and CD-R; a card medium including IC card (including memory card) and optical card; or a semiconductor memory including mask ROM, EPROM, EEPROM, and flash ROM.

In addition, the program codes may be stored so that the computer can read out from the recording medium to directly execute the program codes, or may be stored so that the computer can read out from a program storage area a main storage to which the program codes are transferred from the recording medium.

Further, the system or device may be connected to a communication network (including Internet, Intranet, and others) to supply the program codes via the communication network.

Note that, the system or device stores beforehand therein computer-implemented programs for reading out the program codes from the recording medium and storing them in the main storage and for downloading the program codes via the communication network.

The aforementioned functions are realized in such a manner not only that the computer implements the read program codes, but also that in accordance with the instructions from the program codes an operating system and others which operate on the computer perform an actual processing in whole or in part.

The aforementioned functions are further realized in such a manner that after the program codes read out from the recording medium are written in a memory which is provided in a function expansion board mounted in the computer or a function expansion unit connected to the computer, in accordance with the instructions from the program codes a CPU and others which are provided in the function expansion board or function expansion unit perform an actual processing in whole or in part.

Moreover, the photographing and printing device 1 can be remote-controlled via the communication network.

The present invention is not limited to the aforementioned embodiments and susceptible of various changes within the scope of the accompanying claims. An embodiment obtained by suitable combinations of technical means disclosed in the different embodiments also fall within the technical scope of the present invention.

As described above, a photographing and printing device according to the present invention which prints out a photographed image of a user, includes: mode selecting means for selecting one mode as a selection mode among from a plurality of modes which are set in advance; and mood creating means for creating a mood in accordance with the selection mode.

An method for controlling a photographing and printing device according to the present invention which prints out a photographed image of a user, includes: a mode selecting step of selecting one mode as a selection mode among from a plurality of modes which are set in advance; and a mood creation controlling step of controlling a mood creating device in accordance with the selection mode.

With the above arrangement and method, the photographing and printing device has a plurality of modes and controls the mood creating means (mood creating device) so as to create a mood in the device in accordance with one selection mode selected among from the plurality of modes.

Therefore, the photographing and printing device can create a specific mood throughout the device in various ways for each mode. Here, the mood creating means is a united set of e.g. user interface such as operation screen and voice guidance, tools, lighting, sound, vibration, print setting for color tone and others.

Therefore, since a uniform mood for one mode can be created in various ways, it is possible to realize a low-cost photographing and printing device which can provide users with enough amusement.

Further, the photographing and printing device according to the present invention further includes: photographing means for photographing a user to obtain a photograph image; image editing means for editing the photograph image to obtain an image for printing; and printing means for printing out the image for printing, the image editing means operating in accordance with the selection mode.

Yet further, the method for controlling a photographing and printing device according to the present invention further includes: photographing step of photographing a user to obtain a photograph image; image editing step of editing the photograph image in accordance with the selection mode to obtain an image for printing; and printing step of printing out the image for printing.

With the above arrangement and method, the photographing and printing device can perform image editing processing in accordance with the selection mode. Therefore, it is possible to perform image editing processing matching an entire mood of the photographing and printing device and perform printing with respect to a photographed image of a user. That is, it is possible to perform image processing e.g. addition of pictures in accordance with a mood of the photographing and printing device with respect to the photograph image. In addition, controlling photographing means so as to perform photographing with photographing effects in accordance with the selection mode makes it possible to perform image editing suitable for photographing effects.

Further, the photographing and printing device according to the present invention further includes: storage means for storing the photograph image associated with a selection mode used when the photograph image is taken.

Yet further, the method for controlling a photographing and printing device according to the present invention further includes: storage step of storing the photograph image associated with a selection mode used when the photograph image is taken.

With the above arrangement and method, it is possible to identify the selection mode used when the photograph image is taken. Therefore, when processing the photograph image, the photographing and printing device can make operations in accordance with the selection mode used when the photograph image is taken. For example, in displaying or editing the photograph image, it is possible to edit and create some mood in accordance with the selection mode used at the time of photographing. Therefore, in the case of photographing for a plurality times with the selection mode changed for each photographing, it is possible to display or edit each photograph image in a mood matching the selection mode used at the time of photographing.

Still further, the method for controlling a photographing and printing device according to the present invention further includes: a user status detecting step of detecting a status of the user, wherein the mode selecting step determines the selection mode in accordance with user information detected in the user status detecting step. Note that, it is preferable that the photographing and printing device according to the present invention further includes: a user status detecting means for detecting a status of the user, wherein the mode selecting means determines the selection mode in accordance with user information detected by the user status detecting means.

With the above method, the photographing and printing device can further determine a selection mode in accordance with the detected user information on a status of the user. Here, examples of the user information include the number of users and user's age based on the image showing user's height and face.

Further, the method for controlling a photographing and printing device according to the present invention further includes: a device status detecting step of detecting a status of the photographing and printing device, wherein the mode selecting step determines the selection mode in accordance with device information detected in the device status detecting step. Note that, it is preferable that the photographing and printing device according to the present invention further includes: a device status detecting means for detecting a status of the photographing and printing device, wherein the mode selecting means determines the selection mode in accordance with device information detected by the device status detecting means.

With the above method, the photographing and printing device can further determine a selection mode in accordance with the detected device information on a status of the device. Here, examples of the device information include operating rate of the device, how busy in the surrounding area, and time.

Yet further, in the method for controlling a photographing and printing device according to the present invention, the image editing step includes a secret picture adding step of adding to the image for printing a secret picture without prior presentation to the user. Note that, it is preferable that in the photographing and printing device according to the present invention the image editing means include secret picture adding means for adding to the image for printing a secret picture without prior presentation to the user.

With the above method, the photographing and printing device can further additionally print the secret picture in accordance with the selection mode without presentation of the secret picture to the user. Since this allows the user to see the picture image for the first time after printing, the user can enjoy an output with a surprise. Using this function makes it possible to provide a lottery to give the user e.g. prize and discount coupon and a fortune-telling such as a written oracle so as to enjoy in a simple and easy way, and to provide various unwearying contents.

Still further, in the method for controlling a photographing and printing device according to the present invention, the secret picture adding step determines a position of the secret picture on the image for printing in accordance with input of the user. Note that, it is preferable that in the photographing and printing device of the present invention the secret picture adding means determine a position of the secret picture on the image for printing in accordance with input of the user.

With the above method, the photographing and printing device can further place a secret picture at a position specified by the user. Therefore, the user can arrange the position relationship between the secret picture without prior presentation to the user and other image.

Further, in a printing paper unit of the present invention which is provided in the above photographing and printing device, includes: a printing paper on which an image for printing is printed out; and an identification medium which stores identification information on the printing paper therein, the identification information is read out from the identification medium by identification information reading means provided in the photographing and printing device, and upon a content of the identification information being checked, the image for printing is printed out on the printing paper.

With the above arrangement, it is possible to determine whether the printing paper mounted is available for the photographing and printing device in accordance with the identification information read out by the identification information reading means and to make a printer operable only in the case where it is available. That is, it is possible to set so that the photographing and printing device cannot use other printing papers than the printing paper specified for the photographing and printing device.

Further, in accordance with the identification information with the information on the number of papers included, by counting papers every time the printing paper is used, it is possible to keep track of the number of remaining papers. Therefore, the arrangement in which displaying means or other means give a warning when a low paper condition develops makes it possible to avoid such a problem that a paper-out condition occurs during use by the users.

Yet further, in accordance with the identification information with the information on the type of paper included, by correcting color elements for image data according to the foregoing information, it is possible to output proper images to the paper and ink film.

Still further, a control program of a photographing and printing device according to the present invention is a computer program for executing the steps of the method for controlling the photographing and printing device on a computer.

With the arrangement, by executing the steps of the method for controlling the photographing and printing device on a computer, it is possible to realize the method for controlling the photographing and printing device. This brings about an advantage effect of the method for controlling the photographing and printing device, i.e. an effect that it is possible to create a specific mood throughout the device in various ways.

A computer-readable recording medium storing therein a control program of a photographing and printing device according to the present invention causes a computer to execute the steps to control the photographing and printing device.

With the above arrangement, it is possible to realize the method for controlling a photographing and printing device on a computer by means of the control program of a photographing and printing device which is read out from the recording medium.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A photographing and printing device which prints out a photographed image of a user, comprising:
   mode selecting means for selecting one mode as a selection mode from a plurality of modes representing a plurality of moods which are set in advance;
   photographing means for photographing a user to obtain a photograph image;
   image editing means for editing the photograph image to obtain an image for printing; and
   printing means for printing out the image for printing,
   wherein, the image editing means varies a selection of decorating functions and decorations available for editing of the photographic image in accordance with the selection mode.

2. The photographing and printing device according to claim 1, further comprising:
   storage means for storing the photograph image associated with a selection mode used when the photograph image is taken.

3. A printing paper unit which is provided in a photographing and printing device which prints out a photographed image of a user, comprising:
   mode selecting means for selecting one mode as a section mode from a plurality of modes which are set in advance; and
   mood creating means for creating a mood in accordance with the selection mode,
   wherein the printing paper unit comprises:
   a printing paper on which an image for printing is printed out; and
   an identification medium which stores identification information on the printing paper therein,
   wherein the identification information is read out from the identification medium by identification information reading means provided in the photographing and printing device, and upon a content of the identification information being checked, the image for printing is printed out on the printing paper.

4. A method for controlling a photographing and printing device which prints out a photographed image of a user, comprising:
   mode selecting step of selecting one mode as a selection mode from a plurality of modes representing a plurality of moods which are set in advance;
   photographing step of photographing a user to obtain a photograph image;
   image editing step of varying a selection of decorating functions and decorations available for editing of the photographic image in accordance with the selection mode and editing the photograph image to obtain an image for printing; and
   printing step of printing out the image for printing.

5. The method for controlling a photographing and printing device according to claim 4, further comprising:

storage step of storing the photograph image associated with a selection mode used when the photograph image is taken.

6. A computer-readable recording medium storing therein the control program of a photographing and printing device for executing the method for controlling a photographing and printing device according to claim 4, the control program causing a computer to execute steps of the method.

7. A method for controlling a photographing and printing device which prints out a photographed image of a user, comprising:

a mode selecting step of selecting one mode as a selection mode from a plurality of modes which are set in advance;

a mood creating controlling step of controlling a mood creating device in accordance with the selection mode; and a user status detecting step of detecting a status of the user, wherein the user status detecting step performs a step of analyzing a photograph image and/or a step of analyzing a result of detection by an odor detector, and the mode selecting step determines the selection mode in accordance with user information detected in the user status detecting step.

8. A computer-readable recording medium storing therein a control program of a photographing and printing device for executing the method for controlling a photographing and printing device according to claim 7, the control program causing a computer to execute steps of the method.

9. A method for controlling a photographing and printing device which prints out a photographed image of a user, comprising:

a mode selecting step of selecting one mode as a selection mode from a plurality of modes which are set in advance;

a mood creating controlling step of controlling a mood creating device in accordance with the selection mode; and a device status detecting step of detecting a status of the photographing and printing device, wherein the device status detecting step detects the status of the photographing and printing device in accordance with at least one of the following sets of information: an operating rate of the photographing and printing device; current time; how busy in a surrounding area; operating time; temperature; humidity; and weather condition, and the mode selecting step determines the selection mode in accordance with device information detected in the device status detecting step.

10. A computer-readable recording medium storing therein a control program of a photographing and printing device for executing the method for controlling a photographing and printing device according to claim 9, the control program causing a computer to execute steps of the method.

11. A method for controlling a photographing and printing device which prints out a photographed image of a user, comprising:

a mode selecting step of selecting one mode as a selection mode from a plurality of modes which are set in advance;

photographing step of photographing a user to obtain a photograph image;

image editing step of editing the photograph image in accordance with the selection mode to obtain an image for printing; and printing step of printing out the image for printing, wherein the image editing step includes a secret picture adding step of adding to the image for printing a secret picture without prior presentation to the user.

12. The method for controlling a photographing and printing device according to claim 11, wherein the secret picture adding step determines a position of the secret picture on the image for printing in accordance with input of the user.

13. A computer-readable recording medium storing therein a control program of a photographing and printing device for executing the method for controlling a photographing and printing device according to claim 11, the control program causing a computer to execute steps of the method.

14. A photographing and printing device which prints out a photographed image of a user, comprising:

mode selecting means for selecting one mode as a section mode from a plurality of modes which are set in advance;

mood creating means for creating a mood in accordance with the selection mode; and user status detecting means for detecting a status of the user, the user status detecting means performing a step of analyzing a photograph image and/or a step of analyzing a result of detection by an odor detector, wherein the mode selecting means determines the selection mode in accordance with user information detected by the user status detecting means.

15. A photographing and printing device which prints out a photographed image of a user, comprising:

mode selecting means for selecting one mode as a selection mode from a plurality of modes which are set in advance;

mood creating means for creating a mood in accordance with the selection mode; and device status detecting means for detecting a status of the photographing and printing device, the device status detecting means detecting the status of the photographing and printing device in accordance with at least one of following sets of information: an operating rate of the photographing and printing device; current time; how busy in a surrounding area; operating time; temperature; humidity; and weather condition, wherein the mode selecting means determines the selection mode in accordance with the device information detected by the device status detecting means.

16. A photographing and printing device which prints out a photographed image of a user, comprising:

mode selecting means for selecting one mode as a selection mode from a plurality of modes which arc set in advance;

photographing means for photographing a user to obtain a photograph image;

image editing means for editing the photograph image in accordance with the selection mode to obtain an image for printing; and printing means for printing out the image for printing;

wherein the image editing means performs a secret picture adding step of adding to the image for printing a secret picture without prior presentation to the user.

17. The photographing and printing device according to claim 16, wherein the secret picture adding step determines a position of the secret picture on the image for printing in accordance with input of the user.

* * * * *